United States Patent
Marlatt et al.

(10) Patent No.: US 10,547,693 B2
(45) Date of Patent: Jan. 28, 2020

(54) SECURITY DEVICE CAPABILITY DISCOVERY AND DEVICE SELECTION

(71) Applicant: AVIGILON CORPORATION, Vancouver (CA)

(72) Inventors: Shaun P. Marlatt, Vancouver (CA); Patrick A. Beaulieu, Burnaby (CA); Douglas J. Konrad, North Vancouver (CA); Matthew J. Adam, Vancouver (CA)

(73) Assignee: AVIGILON CORPORATION, Vancouver (CA)

( * ) Notice: Subject to any disclaimer, the term of this patent is extended or adjusted under 35 U.S.C. 154(b) by 438 days.

(21) Appl. No.: 15/087,663

(22) Filed: Mar. 31, 2016

(65) Prior Publication Data

US 2016/0219117 A1    Jul. 28, 2016

Related U.S. Application Data

(63) Continuation-in-part of application No. 14/005,240, filed as application No. PCT/CA2013/050690 on Sep. 6, 2013, now Pat. No. 9,602,582, and a continuation-in-part of application No. 13/607,447, filed on Sep. 7, 2012.

(60) Provisional application No. 62/141,130, filed on Mar. 31, 2015.

(51) Int. Cl.
| | |
|---|---|
| *G06F 15/16* | (2006.01) |
| *H04L 29/12* | (2006.01) |
| *H04L 29/08* | (2006.01) |
| *H04L 12/24* | (2006.01) |

(52) U.S. Cl.
CPC .......... *H04L 67/16* (2013.01); *H04L 41/0816* (2013.01)

(58) Field of Classification Search
None
See application file for complete search history.

(56) References Cited

U.S. PATENT DOCUMENTS

| | | | | |
|---|---|---|---|---|
| 5,341,477 A | * | 8/1994 | Pitkin | G06F 9/505 709/203 |
| 6,601,084 B1 | * | 7/2003 | Bhaskaran | G06F 9/505 709/223 |
| 7,185,076 B1 | | 2/2007 | Novaes et al. | |
| 7,631,034 B1 | * | 12/2009 | Haustein | G06F 9/505 709/201 |

(Continued)

OTHER PUBLICATIONS

International Patent Application No. PCT/CA2013/050690; Int'l Search Report and the Written Opinion; dated Dec. 12, 2013; 11 pages.

(Continued)

*Primary Examiner* — Natisha D Cox
(74) *Attorney, Agent, or Firm* — BakerHostetler

(57) ABSTRACT

A physical security system is described comprising a simplified method for selection of a compute node from a cluster of compute nodes with which to assign a role or acquire a service. The method determines a scalar priority value for compute nodes in the cluster, and allows selection of a compute node by simply choosing the highest priority scalar value. Scalar priority values may be determined by one or more of: a compute node license type, capacity limits, a hardware capability, a software capability, and a current node load.

21 Claims, 25 Drawing Sheets

(56) References Cited

U.S. PATENT DOCUMENTS

| | | | | |
|---|---|---|---|---|
| 8,159,961 | B1* | 4/2012 | Rai | H04L 67/42 370/252 |
| 8,601,112 | B1 | 12/2013 | Nordstrom et al. | |
| 8,675,672 | B1 | 3/2014 | Bao et al. | |
| 8,909,726 | B1* | 12/2014 | Eckert | H04L 45/74 709/207 |
| 2005/0228884 | A1* | 10/2005 | Hawley | H04L 67/1008 709/225 |
| 2006/0015599 | A1 | 1/2006 | Li et al. | |
| 2008/0270569 | A1 | 10/2008 | McBride et al. | |
| 2010/0017460 | A1* | 1/2010 | Shen | G06F 9/505 709/203 |
| 2010/0124271 | A1 | 5/2010 | Martz et al. | |
| 2011/0231524 | A1 | 9/2011 | Lin et al. | |
| 2012/0079092 | A1 | 3/2012 | Woxblorn et al. | |
| 2012/0084383 | A1* | 4/2012 | Bernbo | G06F 17/30215 709/213 |
| 2012/0259912 | A1 | 10/2012 | Kruse et al. | |
| 2012/0317274 | A1 | 12/2012 | Richter et al. | |
| 2013/0073717 | A1 | 3/2013 | Collin et al. | |
| 2013/0198309 | A1* | 8/2013 | Muller | G06F 9/526 709/210 |
| 2013/0262681 | A1* | 10/2013 | Guo | G06F 9/5027 709/226 |
| 2013/0307971 | A1 | 11/2013 | Garnesan et al. | |
| 2013/0329050 | A1 | 12/2013 | Pham et al. | |
| 2014/0074987 | A1* | 3/2014 | Martz | G06F 21/6272 709/219 |
| 2014/0173112 | A1* | 6/2014 | Seago | H04L 67/32 709/226 |
| 2017/0075946 | A1* | 3/2017 | Bossa | G06F 11/14 |
| 2017/0111478 | A1* | 4/2017 | Rai | H04L 67/42 |

OTHER PUBLICATIONS

Almeida, et al. "Interval tree clocks: a logical clock for dynamic systems" *Principles of Distributed Systems.* Springer Berlin Heidelberg, pp. 259-274, 2008.

Amir, et al. "Efficient State Transfer in Partitionable Environments," *Institute of Computer Science, The Hebrew University.* 1997.

Amir, et al. "The Totem Single-Ring Ordering and Membership Protocol," *ACM Transactions on Computer Systems*, vol. 13, No. 4, pp. 311-342, 1995.

Berners-Lee, et al. "Uniform Resource Identifier (URI): Generic Syntax," The Internet Society (2005) as available at: http://tools.ietf.org/html/rfc3986, on Sep. 2, 2012.

Berners-Lee, et al. "Uniform Resource Identifier (URI): Generic Syntax," The Internet Society (2005) as available at: http://tools.ietf.org/html/rfc3986, on Dec. 16, 2013.

Birman. "Chapter 6: A history of the virtual synchrony replication model." *Replication.* Springer Berlin Heidelberg, pp. 91-120, 2010.

DeCandia, et al. "Dynamo: amazon's highly available key-value store." *ACM SIGOPS Operating Systems Review.* vol. 41. No. 6. ACM, 2007.

Google Developers. "Protocol Buffers," as available at: https://developers.google.com/protocol-buffers/docs/encoding, on Jun. 2, 2012.

Google Developers. "Protocol Buffers," as available at: https://developers.google.com/protocol-buffers/docs/encoding, on Dec. 16, 2013.

Leach, et al. "A Universally Unique Identifier (UUID) URN Namespace," The Internet Society (2005), as available at: http://tools.ietf.org/html/rfc4122, on Sep. 4, 2012.

Leach, et al. "A Universally Unique Identifier (UUID) URN Namespace," The Internet Society (2005), as available at: http://tools.ietf.org/html/rfc4122, on Dec. 16, 2013.

Moser, et al. "Extended Virtual Synchrony." *Distributed Computing Systems, 1994, Proceedings of the 14th International Conference on.* IEEE, 1994.

OASIS Web Services Dynamic Discovery (WS-Discovery) Version 1.1, OASIS Standard, as available at: http://docs.oasis-open.org/ws-dd/discovery/I.1/os/wsdd-discovery-1.1-spec-os.pdf, on Jul. 1, 2009.

"Project Voldemort—A distributed database," as available at: http://www.project-voldemort.com/, on Dec. 16, 2013.

"Project Voldemort—A distributed database," as available at: http://www.project-voldemort.com/, on Sep. 2, 2012.

"Riak" as available at: http://www.basho.com/Riak.html, on Dec. 16, 2013.

The Apache Software Foundation, "Cassandra," (2009) as available at: http://cassandra.apache.org/, on Sep. 5, 2012.

The Apache Software Foundation, "Cassandra," (2009) as available at: http://cassandra.apache.org/, on Dec. 16, 2013.

Van Renesse, et al. "A Gossip-Style Failure Detection Service," *IFIP International Conference on Distributed Systems Platforms and Open Distributed Processing*, pp. 55-70, 1998.

Van Renesse, et al. "Efficient Reconciliation and Flow Control for Anti-Entropy Protocols." *Proceedings of the 2nd Workshop on Large-Scale Distributed Systems and Middleware.* ACM, 2008.

Wikipedia. "Galois/Counter Mode," as available at: http://en.wikipedia.org/wiki/Galois/Counter Mode, on Aug. 17, 2012.

Wikipedia. "Galois/Counter Mode," as available at: http://en.wikipedia.org/wiki/Galois/Counter Mode, on Dec. 16, 2013.

Wikipedia. "Gossip Protocol," as available at: http://en.wikipedia.org/wiki/Gossiop_protocol on Jul. 16, 2012.

Wikipedia. "Gossip Protocol," as available at: http://en.wikipedia.org/wiki/Gossip protocol, on Dec. 16, 2013.

Wikipedia. "Maximum Transmission Unit," as available at: http://en.wikipedia.org/wiki/Maximum transmission unit, on Dec. 16, 2013.

Wikipedia. "Maximum Transmission Unit," as available at: http://en.wikipedia.org/wiki/Maximum transmission unit, on Aug. 27, 2012.

Wikipedia. "Virtual Synchrony," as available at: http://en.wikipedia.org/wikiNirtual synchrony, on accessed Dec. 16, 2013.

Wikipedia. "Virtual Synchrony," as available at: http://en.wikipedia.org/wikiNirtual synchrony, on accessed Jun. 15, 2012.

Wikipedia. "WS-Discovery," as available at: http://en.wikipedia.org/wiki/WS- Discovery, on Apr. 5, 2012.

Wikipedia. "WS-Discovery," as available at: http://en.wikipedia.org/wiki/WS- Discovery, on Dec. 16, 2013.

Zhou, et al. "An Efficient Topology-Adaptive Membership Protocol for Large-Scale Cluster-Based Services," *Parallel and Distributed Processing Symposium, 2005. Proceedings. 19th IEEE International.* IEEE, 2005.

Office action dated, issued by the United States Patent and Trademark Office in related U.S. Appl. No. 13/607,447, filed Sep. 7, 2012.

Office action dated Apr. 14, 2015, issued by the United States Patent and Trademark Office in related U.S. Appl. No. 13/607,447, filed Sep. 7, 2012.

Agarwal et al.; "The Totem Multiple-Ring Ordering and Topology Maintenance Protocol"; ACM Transactions on Computer Systems; vol. 16 No. 2; May 1998; p. 93-132.

\* cited by examiner

SECURITY DEVICE CAPABILITY DISCOVERY AND DEVICE SELECTION

CROSS REFERENCE TO RELATED APPLICATIONS

This application claims benefit under 35 U.S.C. § 119(e) of Provisional U.S. Patent Application No. 62/141,130, filed Mar. 31, 2016. This application is also a continuation-in-part of U.S. patent application Ser. No. 14/005,240, filed Sep. 13, 2013, which is the National Stage of International Application No. PCT/CA2013/050690, filed Sep. 6, 2013, which is a continuation-in-part of U.S. patent application Ser. No. 13/607,447, filed Sep. 7, 2012, the entire contents of each of which are hereby incorporated by reference in their entirety. U.S. patent application Ser. No. 14/005,240, filed Sep. 13, 2013, is also a continuation-in-part of U.S. patent application Ser. No. 13/607,447, filed Sep. 7, 2012, the entire contents of which are hereby incorporated by reference in its entirety.

TECHNICAL FIELD

This disclosure relates to physical security monitoring systems.

BACKGROUND

Physical security systems traditionally employ humans to, for example, provide access control to a building, monitor public safety in a stadium, or prevent theft in a retail store. Modern electronic physical security systems employ a variety of electronic sensors in or around the secured space, allowing for recording, remote live monitoring, or even automatic notification should certain conditions occur. Many types of electronic sensors are used for security systems, from simple contact switches that indicate a window or door has been opened in a residential home, to panoramic video cameras observing a large portion of a sports stadium.

Electronic sensors can be combined with computers to, for example, control the sensor, allow live human observation of sensor output, record the sensor output for later use, or analyze and detect security conditions based on sensor output. While sensors and computers may be directly connected or part of the same physical device, they may also be connected via a computer network. Security requirements may dictate that many sensors be used, all of which can be connected via a computer network. Multiple computers or computing nodes can be required due to the resource limitations of a single computer for computer-based recording and/or analysis of sensor output of multiple sensors or just a single high data rate sensor, such as a high-definition camera. Such resource limitations that necessitate multiple compute nodes may include limits in storage capacity or bandwidth, network bandwidth, and processor processing speed. Multiple computing nodes and multiple cameras can also provide redundancy for improved reliability of a security system.

Distributed security systems with multiple computing nodes often have (or are assumed to have) all computing nodes with homogeneous hardware capabilities. This simplifies configuration and maintenance of the security system.

SUMMARY

Capability discovery systems for a heterogeneous physical security system cluster are disclosed herein, including systems comprising a compute node that is a member of the cluster, configured to: determine a self-priority value, wherein the self-priority value is a single scalar value that indicates a priority for providing a service; provide the self-priority value with an identifier for the compute node to one or more other compute nodes, wherein the other compute nodes are also members of the cluster; receive additional priority values for providing the service with associated compute node identifiers for the one or more other compute nodes; create a service priority list comprising the self-priority value and the additional priority values with associated compute node identifiers; and provide the service priority list to a service requestor; and wherein the compute node members of the cluster have heterogeneous capabilities, and the self-priority value and additional priority values are based at least in part on the capabilities of the associated compute node. The capabilities of the associated compute node may include at least one of: a compute node license type, capacity limits, a hardware capability, a software capability, and a current node load. A license type may be chosen from a group that includes one or more of: enterprise, standard, core, and embedded. Other license types are possible. A hardware capability may be chosen from a group that includes one or more of: storage capacity, network connection type or bandwidth, processor type, memory capacity, and video analytics. A current node load may be based on a count of instances of the service concurrently being provided by the associated compute node to any service requestor.

Also disclosed is the capability discovery system above, wherein the self-priority value is determined at least in part by starting with a first scalar constant, and then subtracting a second scalar constant for each of the count of instances being provided.

This Summary is provided to introduce a selection of concepts in a simplified form that are described further in the Detailed Description of Illustrative Embodiments below. This Summary is not intended to identify essential features or key features of the claimed subject matter, nor is it intended to be used to limit the scope of the claimed subject matter.

BRIEF DESCRIPTION OF THE DRAWINGS

In the accompanying drawings, which illustrate one or more exemplary embodiments.

DETAILED DESCRIPTION OF ILLUSTRATIVE EMBODIMENTS

Figure 1:
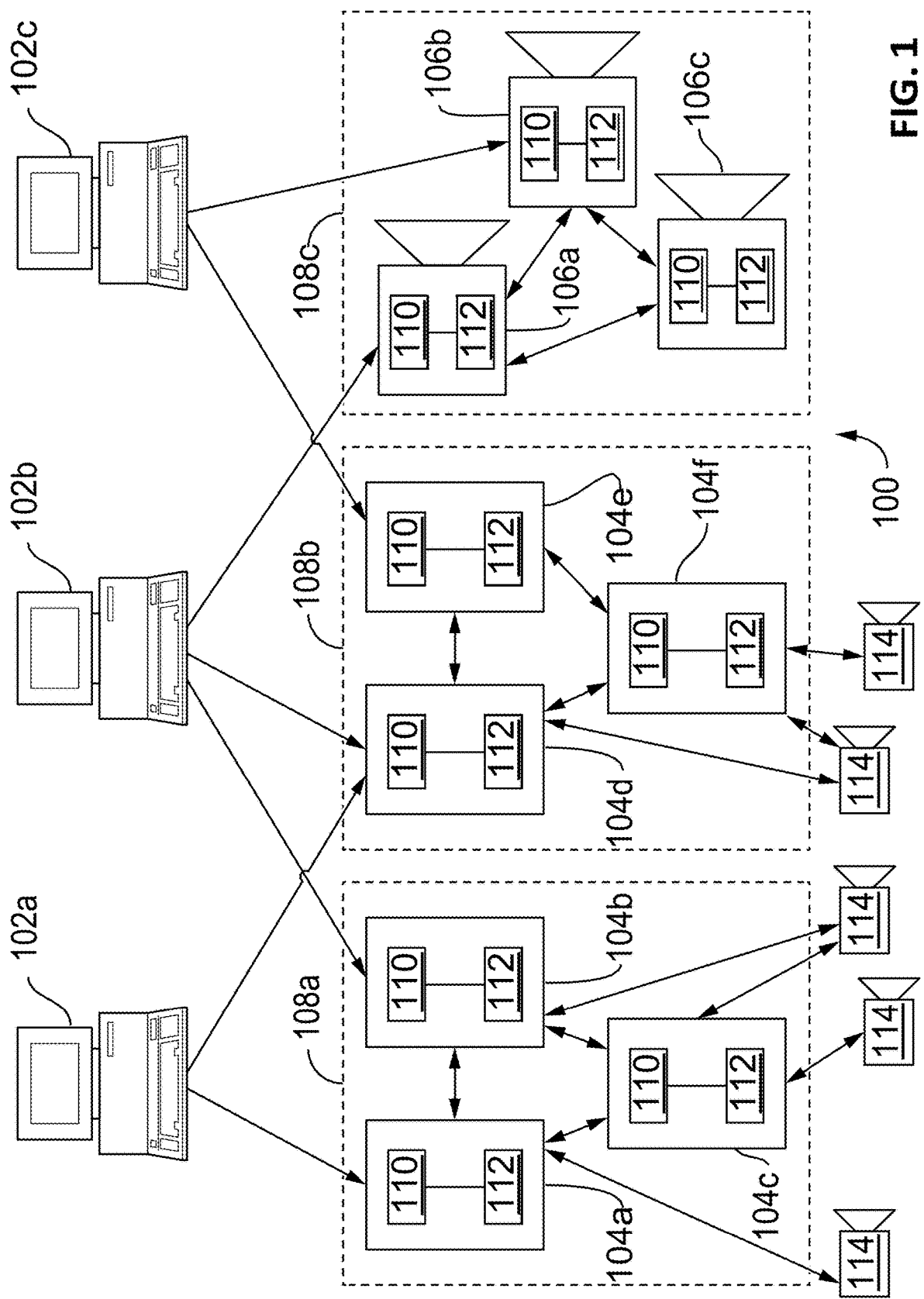
FIG. 1 is a block diagram of a distributed physical security system, according to one embodiment.

This application discloses systems and methods for logically arranging the elements of a physical security system given a physical topology of the system elements. This includes methods for discovering and publishing capabilities of physical security system elements such as sensors and compute nodes, methods for simplified replacement of a security system element such as a camera, methods for automatically assigning roles or workloads amongst the various elements in a distributed computer security system, and methods for abstracting capabilities of system elements to simplify system configuration or role assignment.

These methods can save costs, improve reliability, and simplify use or management of security systems. Distributed heterogeneous physical security systems can be inherently complex systems, with many tasks running in parallel, and various types of resource bottlenecks throughout the system. The methods in this disclosure can help make a physical security system more reliable by providing replication of data and role assignments that allow continued operation of critical functions despite the failure of some compute nodes, sensors, or network connections. Setup and maintenance can be simplified and costs can be reduced by automating role assignment to compute nodes, and by reusing prior configuration information when a physical element, such as a compute node or sensor, is replaced.

Discovery and publishing of system element capabilities is useful in distributed physical security systems, and is especially useful when the security system is comprised of heterogeneous elements. In a security system comprising multiple compute nodes or multiple sensors, such as cameras, not all compute nodes or cameras necessarily have identical capabilities. Such a distributed or multi-element system will likely have certain functions or tasks distributed across the multiple elements. To distribute those tasks, it is helpful for all compute nodes to understand the capabilities of all of the elements in the security system. When a new element is introduced, its capabilities may be discovered and stored as data that is replicated (or distributed or published) across multiple compute nodes. This can be a multi-master replication process, where a versioning of configuration data file (or directory) elements may be used to identify newer versions of the shared and replicated configuration data.

A heterogeneous system may have elements of different classes, such as an enterprise server class, an appliance class, camera device class, and a smart switch class. The class of an element may indicate the element's primary purposes, or may indicate common combinations of hardware capabilities and software capabilities, among other information. For example, an enterprise server class may have a fast processor, a large amount of fast persistent storage, a large amount of random access memory (RAM), a wide variety of software service capabilities, and an enterprise license allowing enterprise services such as lightweight directory access protocol (LDAP), high concurrent service counts, such as hundreds of connected devices, or hundreds of client frontend sessions. An appliance class, on the other hand, may have moderate storage with an attached camera, few software services beyond serving the recording of its own camera, an embedded license, and smaller license limits of just 1 to 4 instances of services such as client-frontend sessions. A smart switch class may provide network switch hardware, minimal storage, few software services beyond recording a small number of live video streams, may also have an embedded license with even smaller license limits on services.

The capabilities of a compute node in a physical security system may vary between classes of element or within a class of elements. Capabilities of a security system element may include: license type, capacity limits, hardware capabilities, and software capabilities. The capabilities of an element can also depend on the current load on the element. Each of these types of capabilities is described below.

A license type may indicate a class of hardware or software available on a compute node, such as an enterprise license, standard license, core license, or embedded license. A license limit may indicate, for example, a number of simultaneous instances of a service that a compute node is allowed by license to provide. For example, a compute node may have an enterprise license, which may indicate that it can host a client, That example compute node may also have a license limit for hosting up to 50 clients, such that the node is not allowed by license to host more than 50 simultaneous clients. A standard license may also allow hosting a client, but may have a license count of only 10 simultaneous clients. An embedded license may not allow client hosting at all.

A capacity limit may be unrelated to hardware capacity, for example, it may be determined by the license limit or class of license purchased for a particular compute node. Or a capacity limit may be based on hardware capacity, which can be determined, for example, by testing a specific system for a specific service and encoding the capacity determined as a capacity limit in a persistently stored configuration file. A capacity limit may be determined during the design of the compute node, in the factory while manufacturing a particular compute node, during installation and initial qualification in the field, or can be determined dynamically at runtime while the compute node is in operation.

Hardware capabilities may include any physical feature of the system element, and may include the physical environment of the system element. Such hardware capabilities may include the central processing unit (CPU) performance, network proximity, network throughput, memory capacity, storage capacity, storage speed, analytics abilities, and other hardware capabilities. Hardware capabilities may also include co-processors for decoding, transcoding, and encoding video-data, signal-processing, and encryption; storage capacity; network connection type or bandwidth; processor type; memory capacity; video analytics hardware; and a surveillance camera. Software capabilities may include supported services and roles. Examples of software capabilities include login and authentication, lightweight directory access protocol (LDAP), email, point-of-sale, gateway/proxy, and video-archiver.

Hardware capabilities may be determined in a variety of ways. For example, runtime software on a compute node can determine that a surveillance camera is present or the amount of physical memory available. More generally, as with hardware capacity above, hardware capabilities may also be determined during the design of the compute node, in the factory while manufacturing a particular compute node, during installation and initial qualification in the field, or can be determined dynamically at runtime while the compute node is in operation.

Replacing elements of a security system can be simplified by automation that applies configuration information from an old removed element to a new similar element. For example, if a camera sensor becomes defective and is replaced with an upgraded model, a security system can recognize that the upgraded model is intended to replace the removed camera based on one or more attributes of both cameras. Attributes of an added element that indicate it is a replacement of an old element instead of an addition of a new element may include: the network location of the added element, the manufacturer model identifier, which scene is observed or sensed by the added element (if the element is a sensor), the resolution or other attributes of a sensing element, output data rate of sensors, output data format of sensors, or element class. When installing and configuring a new element, end-users may also specify to the system that the new element should replace an existing element.

Once a new security system element is identified as being a replacement, configuration for that element within the security system can be determined, at least in part, based on the configuration of the previously removed element. For example, if the replaced element is a camera sensor, image capture parameters, such as capture resolution, frame rate, or exposure settings, can be set based on the image capture parameters from the removed camera. Other configuration information for a camera might include: an output data format; choice of recording location or locations, for example which server video from the camera is recorded onto; analytics to apply to the sensor data, for example detecting motion above a certain speed or within a certain region of the sensed scene; or choose which alarms to apply to the video data, for example an alert indicator on a security system user interface, or a text message sent to a home owner. The security system will also associate previously archived data, metadata, and events generated by the old element with the new element that replaced it. When an added system element is determined to be a replacement, any or all of its configuration information can be duplicated, or made similar to, the configuration information of a component that it has been determined to be replacing.

Role or workload assignment of individual system elements is necessary in a distributed system, even with homogeneity of network elements. Resource bottlenecks can necessitate what a distributed multi-node system includes, such as: processor speed or performance, network bandwidth, storage capacity, storage speed, or performance (often described as input-output operations per second, or IOPS). For example, a physical security system may include three identical compute nodes because no one compute node has enough resources to do all the tasks necessary for the security system. A first compute node may be assigned, for example, the role of doing software analytics (such as motion analysis or other computer vision techniques on a video from a camera) to detect security problems, a second compute node may have a role of recording a version of all sensor data for later viewing or analysis, and a third compute node's role may be to provide an alert notification service for when the analytics system on the first compute node detects a security problem.

Automated role distribution may be based on the capacity of individual identical compute nodes. In such a homogeneous environment, distribution may be based on the capacity limit due to resource limitations of each homogenous element. For example, video recording nodes (network video recorders or NVRs) in a security system with several high-resolution cameras may be limited to recording the output of only, for example, two cameras. Such a simultaneous recording limit may be due to the resource limitations of network bandwidth, storage capacity, storage bandwidth, and processing power for transcoding (converting the format) of video streams. The recording roles should be distributed such that these capacity limitations are not exceeded. A human user can distribute roles meeting these limitations, for example, when new cameras or storage nodes are added to a security system. Or role assignment can be automated by the system, requiring less manual user configuration, by assigning, for example, the recording roles for each camera to the storage node with closest network proximity to each camera until some resource threshold or limit is reached on a recording node, at which point the next recording role to be assigned might be assigned to the recording node with the next closest network proximity.

In a heterogeneous environment, role assignment may additionally be made based on differences in the basic capabilities of the compute nodes, in addition to the capacity limits of individual nodes. For example, only certain compute nodes may have the capability to operate as a video recording element due to resource limitations such as those limitations discussed above, for example, storage capacity, storage performance, or network bandwidth limitations. Alternatively, certain compute nodes may have custom analytics hardware or an especially fast processor that is better suited for the analytics role, and other compute nodes may have special hardware to perform real-time video transcoding for mobile clients.

Role assignment can be simplified by creating an abstracted capability description of system elements. Multiple capability factors can be combined into a single scalar priority value, and a default priority value can be reduced based on current load. For example, for a compute node element, one or more element capabilities can be combined into a default priority for elements that have a certain set of capabilities. Compute nodes with a certain class of resources, such as a certain processor speed class with a certain network interface speed, might be assigned a default priority X, while other compute nodes with a higher or faster class of those resources might be assigned a default priority of Y, where Y is greater than X. More generally, a default priority value is a scalar value that may be based in part on hardware capabilities, software capabilities, license type, or capacity limits.

The current load on a compute node can also be reflected by a single scalar value, which can be used in combination with a default priority value to produce a current priority value for the compute node. The current load can be measured, for example, by the number of instances or copies of a particular service or role that is assigned to the compute node. A current priority value for the compute node can be determined by starting with the default priority and then reducing it based on the number and types of loads (roles) currently running on or assigned to that node. For example, a current priority value for a particular service on a compute node can be set to the default priority for that service on that compute node (a first scalar constant), and subtracting an amount corresponding to the load on that compute node. The amount corresponding to the load may be approximated, for example, by multiplying the number of instances of a service already running on that node by a load constant (a second scalar constant). So, a compute node that offers two services (called service A and service B) may set the current priority value for service A=default priority value for service A−(A_service_count*A_service_cost)−(B_service_count*B_service_cost), where A_service_count is the count of current instances of service A running on the compute node, A_service_cost is a scalar constant related to the load of an instance of service A, and B is a separate service on the same compute node that has impact on the capacity for service A. More complex determinations of current load can also be based on measured or estimated current hardware resource usage, where hardware resources include, for example, network, memory, storage, and CPU.

A role can then be assigned based only on a current priority list. A client or server attempting to assign a role or otherwise configure the system can do so based on lists of current priority values for various services and for all compute nodes in a cluster (or a sub-cluster, such as a child site). Role assignment in even a large heterogeneous security system can become as simple as choosing to assign the role to the compute node with the highest current scalar priority associated with that role or service. If multiple nodes have the same current priority, any node amongst the group with the highest priority can be chosen. If multiple nodes have a similar priority, choosing amongst the group of highest priority can be done, for example, based on random selection, or it can be done based additionally on less abstracted capabilities of the nodes having the highest currently priority.

Predicting the capacity of a compute node for a certain task (or service) often cannot be done perfectly and an abstracted capability description may further make a capacity prediction more inaccurate. A simple trial-and-error method can be used to address situations where capacity is overestimated. For example, once a node is selected for role assignment, the attempt can be made to assign that role to that node. If assignment fails, the selected node can be removed from the priority list, and then another node can be selected from the amended priority list. Other methods of handling inaccurate capacity predictions are possible.

As an example of this simplified role assignment based on an abstracted capability description, assume two dissimilar nodes in a cluster. One node has a processor capable of handling the load of 20 simultaneous instances of a service, while another node only has the capability of handling 2. The more capable node may also perform its services faster, so there may be a preference to choose the services from the more capable node before the less capable node. The first node being more capable has a default priority for one of its service of 1000 (a first scalar constant), while the second node's default priority is 10. Before any loads are assigned, a client wishing to assign a load to the cluster may collect the list of current priority values for each compute node in the cluster. Initially, the nodes would have current priority values of 1000 and 10. The client would preferentially choose the node with a priority value of 1000. After assigning the load to the more capable compute node, the more capable node would reduce its current priority by 50 (a second scalar constant) to 950. A second client load would reduce its current priority to 900 and so, on, until the priority value for this node dropped to 0. Subsequent client workloads would be assigned to the less capable node with a priority value of 10. The second node may reduce its current priority by 5 for each client load until its priority value reached 0, allowing a maximum of 2 client loads. A useful feature of this example is that the default priority for the less capable node has a default priority less than the cost of a single load (second scalar constant) on the more capable node, with the effect being that the more capable node is fully loaded prior to assigning a single load to the less capable node. In a simpler case, where nodes are similar, they may start with the same initial priorities and costs. Client loads would end up being assigned alternately between the nodes. Many other arrangements of default priorities (first scalar value) and load cost (second scalar value) are possible.

A variation of this process can account for load role assignments with a variable. For example, if the role (service) being assigned is that of a networked video recorder (NVR), a single NVR node may have capacity to simultaneously record 4 low resolution video stream, or only 2 higher resolution video stream. The amount of deduction from the default priority value may depend on some attribute of a currently assigned role. In the NVR example, the priority deduction due to a particular assignment may depend on the resolution or data rate of the video being recorded in that assignment. Many other methods are possible for determining a current priority based on default priority and pre-existing load.

Many types of services or roles can be assigned with these methods. Examples may include, for example, selecting a host node for a client user interface, selecting a host node to act as a network video recorder (NVR) of a security camera, or selecting a host node to perform transcoding or analytics on a video stream. For example, when selecting a host for a client, the client computer in a physical security system may enable, for example, security monitoring or system management by a human, and will require resources on the client's host node. To select a host node for a client, the node should have the appropriate license, physical and software capabilities, and the current load on the node should allow for sufficient resources for a new client servicing load. Similarly, when selecting an NVR, sufficient network bandwidth and disk capacity, for example, may be required. Selecting a host to perform transcoding or video analytics may, for example, require hardware or software for the transcoding or analytics, and sufficiently unallocated load capacity. An abstracted current priority value for a particular service or role can be used to choose best node amongst available nodes without requiring the choosing process to understand the details of which specific resources are required for that service or load capacity.

These methods for server or compute node selection may be applied by any compute node (server, client, camera, etc.) in a system to assign roles to other nodes. For example, embedded devices, such as cameras and switches, may have roles assigned to them, such as an email role, LDAP role, or gateway role, by an enterprise node elsewhere in the system. These methods for node selection can also be combined with other methods. For example, a human user may specify a subset of nodes for a particular service, such as specifying that only certain designated enterprise nodes can perform the LDAP role. The system itself (a compute node in the system) could then use the scalar priority list method to choose amongst the designated nodes when the LDAP role is needed. Such automated dynamic selection amongst the designated nodes can aid in load balancing or provide redundancy without requiring any further involvement by a human user.

Distributed Physical Security System

A physical security system is a system that implements measures to prevent unauthorized persons from gaining physical access to an asset, such as a building, a facility, or confidential information. Examples of physical security systems include surveillance systems, such as a system in which cameras are used to monitor the asset and those in proximity to it; access control systems, such as a system that uses RFID cards to control access to a building; intrusion detection systems, such as a home burglary alarm system; and combinations of the foregoing systems.

A physical security system often incorporates computers. As this type of physical security system grows, the computing power required to operate the system increases. For example, as the number of cameras in a surveillance system increases, the requisite amount of computing power also increases to allow additional video to be stored and to allow simultaneous use and management of a higher number of cameras. Research and development accordingly continue into overcoming problems encountered as a physical security system grows.

Directional terms such as "top," "bottom," "upwards," "downwards," "vertically," and "laterally" are used in the following description for the purpose of providing relative reference only, and are not intended to suggest any limitations on how any article is to be positioned during use, or to be mounted in an assembly or relative to an environment. Additionally, the term "couple" and variants of it such as "coupled", "couples", and "coupling" as used in this description is intended to include indirect and direct connections unless otherwise indicated. For example, if a first device is coupled to a second device, that coupling may be through a direct connection or through an indirect connection via other devices and connections. Similarly, if the first device is communicatively coupled to the second device, communication may be through a direct connection or through an indirect connection via other devices and connections.

Once a surveillance system grows to include a certain number of cameras, it becomes impractical or impossible to operate the surveillance system using a single server because of storage capacity and processing power limitations. Accordingly, to accommodate the increased number of cameras, additional servers are added to the system. This results in a number of problems.

For example, a user of the surveillance system may want to be able to see what another user is viewing (that user's "view") and stream video that is captured using a camera in the system or that is stored on a server in the system even if the user is not directly connected to that camera or that server, respectively. Similarly, the user may want to be able to access user states (e.g.: whether another user of the system is currently logged into the system) and system events (e.g.: whether an alarm has been triggered) that are occurring elsewhere in the system, even if they originate on a server to which the user is not directly connected. In a conventional surveillance system that has been scaled out by adding more servers, a typical way to provide this functionality is to add a centralized gateway server to the system. A centralized gateway server routes system events, user states, views, and video from one server in the system to another through itself, thereby allowing the user to access or view these events, states, views, and video regardless of the particular server to which the user is directly connected. However, using a centralized gateway server gives the surveillance system a single point of failure, since if the centralized gateway server fails then the events, states, views, and video can no longer be shared. Using a centralized gateway server also increases the surveillance system's cost, since a server is added to the system and is dedicated to providing the centralized gateway server's functionality.

The user may also want common settings (e.g.: user access information in the form of usernames, passwords, access rights, etc.) to be synchronized across multiple servers in the system. In a conventional surveillance system that has been scaled out by adding more servers, this functionality is provided either by manually exporting settings from one server to other servers, or by using a centralized management server that stores all of these settings that other servers communicate with as necessary to retrieve these settings. Manually exporting settings is problematic because of relatively large synchronization delays, difficulty of use and setup, and because large synchronization delays prejudices system redundancy. Using the centralized management server suffers from the same problems as using the centralized gateway server, as discussed above.

Some of the embodiments described herein are directed at a distributed physical security system, such as a surveillance system, that can automatically share data such as views, video, system events, user states, and user settings between two or more server nodes in the system without relying on a centralized server such as the gateway or management servers discussed above. These embodiments are directed at a peer-to-peer surveillance system in which users connect via clients to servers nodes, such as network video recorders, cameras, and servers. Server nodes are grouped together in clusters, with each server node in the cluster being able to share data with the other server nodes in the cluster. To share this data, each of the server nodes runs services that exchange data based on a protocol suite that shares data between the server nodes in different ways depending on whether the data represents views, video, system events, user states, or user settings. FIGS. 1 to 10 depict these embodiments.

Figure 10:
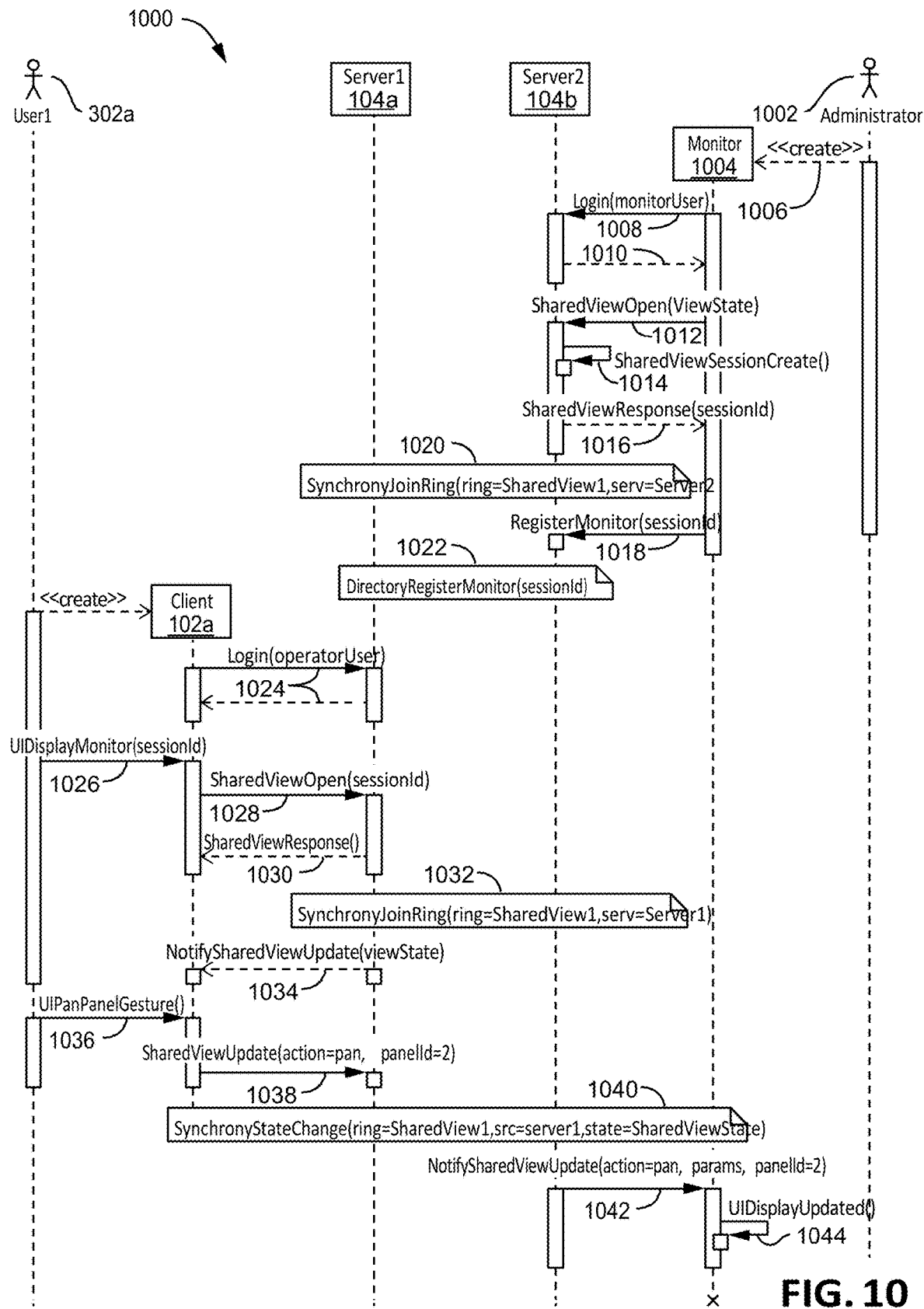
FIG. 10 is a UML sequence diagram showing how the system of FIG. 1 shares an unattended view with a system user.
Figure 11:
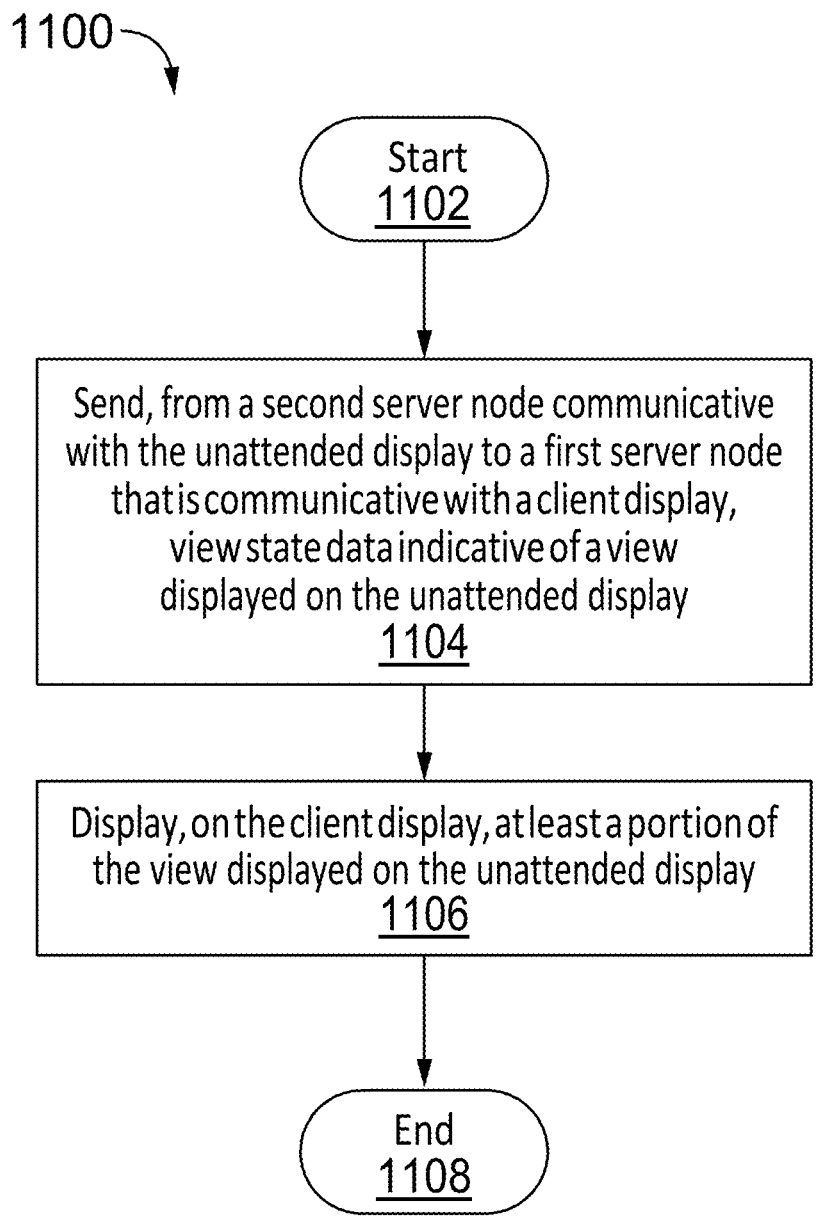
FIG. 11 is a method for interacting with an unattended display in a physical security system that comprises a plurality of server nodes, according to another embodiment.

In alternative embodiments, some of the technology used to share views between different server nodes is applicable to federated networks (i.e., networks that include a centralized server) and to peer-to-peer networks such as those shown in FIGS. 1 to 9. FIGS. 10 and 11 depict these embodiments.

Referring now to FIG. 1, there is shown a distributed physical security system in the form of a surveillance system 100, according to one embodiment. The system 100 includes three clients 102a-c (first client 102a to third client 102c and collectively "clients 102"), six servers 104a-f (first server 104a to sixth server 104f and collectively "servers 104"), three server node cameras 106a-c (first node camera 106a to third node camera 106c and collectively "node cameras 106"); and five non-node cameras 114.

Each of the node cameras 106 and servers 104 includes a processor 110 and a memory 112 that are communicatively coupled to each other, with the memory 112 having encoded thereon statements and instructions to cause the processor 110 to perform any embodiments of the methods described herein. The servers 104 and node cameras 106 are grouped into three clusters 108a-c (collectively "clusters 108"): the first through third servers 104a-c are communicatively coupled to each other to form a first cluster 108a; the fourth through sixth servers 104d-f are communicatively coupled to each other to form a second cluster 108b; and the three node cameras 106 are communicatively coupled to each other to form a third cluster 108c. The first through third servers 104a-c are referred to as "members" of the first cluster 108a; the fourth through sixth servers 104d-f are referred to as "members" of the second cluster 108b; and the first through third node cameras 106a-c are referred to as "members" of the third cluster 108c.

Each of the servers 104 and node cameras 106 is a "server node" in that each is aware of the presence of the other members of its cluster 108 and can send data to the other members of its cluster 108; in contrast, the non-node cameras 114 are not server nodes in that they are aware only of the servers 104a, b, c, d, f to which they are directly connected. In the depicted embodiment, the server nodes are aware of all of the other members of the cluster 108 by virtue of having access to cluster membership information, which lists all of the server nodes in the cluster 108. The cluster membership information is stored persistently and locally on each of the server nodes, which allows each of the server nodes to automatically rejoin its cluster 108 should it reboot during the system 100's operation. A reference hereinafter to a "node" is a reference to a "server node" unless otherwise indicated.

While in the depicted embodiment none of the clusters 108 participate in intercluster communication, in alternative embodiments (not shown) the members of various clusters 108 may share data with each other. In the depicted embodiment the servers 104 are commercial off-the-shelf servers and the cameras 106,114 are manufactured by Avigilon™ Corporation of Vancouver, Canada; however, in alternative embodiments, other suitable types of servers 108 and cameras 106,114 may be used.

The first client 102a is communicatively coupled to the first and second clusters 108a,b by virtue of being communicatively coupled to the first and fourth servers 104a,d, which are members of those clusters 108a,b; the second client 102b is communicatively coupled to all three clusters 108 by virtue of being communicatively coupled to the second and fourth servers 104b,d and the first node camera 106a, which are members of those clusters 108; and the third client 102c is communicatively coupled to the second and third clusters 108b,c by virtue of being communicatively coupled to the fifth server 104e and the second node camera 106b, which are members of those clusters 108b,c. As discussed in more detail below, each of the nodes runs services that allow each of the nodes to communicate with each other according to a protocol suite 200 (shown in FIG. 2) to allow any one node to share data, whether that data be views, video, system events, user states, user settings, or another kind of data, to any other node using distributed computing; i.e., without using a centralized server. Each of the nodes has access to cluster membership information that identifies all the nodes that form part of the same cluster 108; by accessing this cluster membership information, data can be shared and synchronized between all the nodes of a cluster 108.

Figure 2:
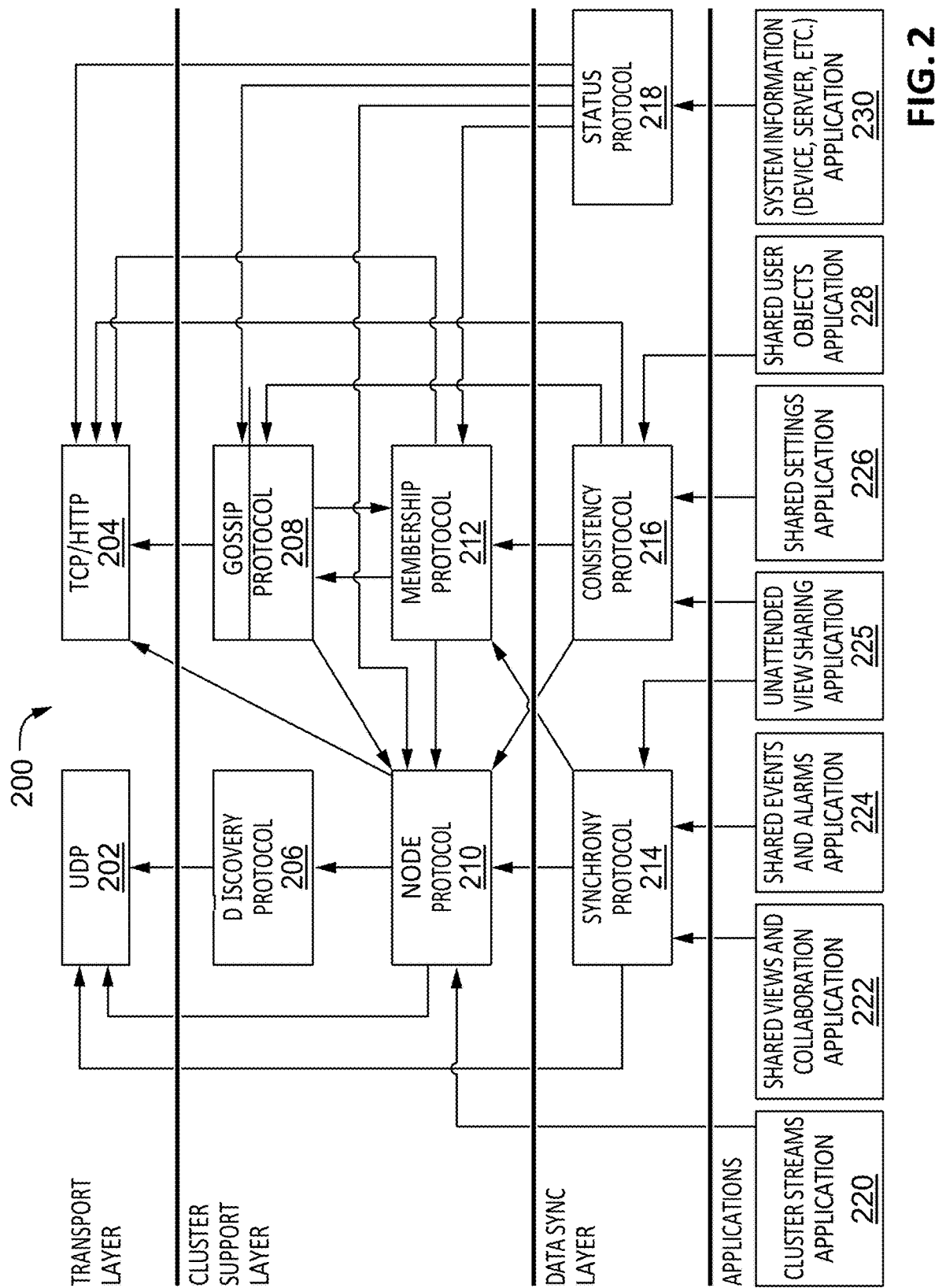
FIG. 2 is a block diagram of a protocol suit used by the system of FIG. 1.

FIG. 2 shows a block diagram of the protocol suite 200 employed by the nodes of the system 100. The protocol suite 200 is divided into three layers and includes the following protocols, as summarized in Table 1:

TABLE 1

Summary of the Protocol Suite 200

| Protocol Name | Protocol Layer | Receives Data from these Protocols and Applications | Sends Data to these Protocols |
| --- | --- | --- | --- |
| UDP 202 | Transport | Discovery Protocol 206, Node Protocol 210, Synchrony Protocol 214 | N/A |
| TCP/HTTP 204 | Transport | Node Protocol 210, Gossip Protocol 208, Membership Protocol 212, Consistency Protocol 216, Status Protocol 218 | N/A |
| Discovery Protocol 206 | Cluster Support | Node Protocol 210 | UDP 202 |
| Gossip Protocol 208 | Cluster Support | Membership Protocol 212, Consistency Protocol 216, Status Protocol 218 | TCP/HTTP 204, Node Protocol 210, Membership Protocol 212 |
| Node Protocol 210 | Cluster Support | Cluster Streams Application 220, Synchrony 214, Consistency Protocol 216, Membership Protocol 212, Status Protocol 218, Gossip Protocol 208 | UDP 202, TCP/HTTP 204, Discovery Protocol 206 |
| Membership Protocol 212 | Cluster Support | Synchrony Protocol 214, Gossip Protocol 208, Status Protocol 218, Consistency Protocol 216 | Gossip Protocol 208, Node Protocol 210, TCP/HTTP 204 |
| Synchrony Protocol 214 | Data Sync | Shared Views and Collaboration Application 222, Shared Events and Alarms Application 224, Unattended View Sharing Application 225 | UDP 202, Node Protocol 210, Membership Protocol 212 |

TABLE 1-continued

Summary of the Protocol Suite 200

| Protocol Name | Protocol Layer | Receives Data from these Protocols and Applications | Sends Data to these Protocols |
| --- | --- | --- | --- |
| Consistency Protocol 216 | Data Sync | Shared Settings Application 226, Shared User Objects Application 228, Unattended View Sharing Application 225 | Node Protocol 210, Membership Protocol 212, Gossip Protocol 208, TCP/HTTP 204 |
| Status Protocol 218 | Data Sync | System Information (device, server, etc.) Application 230 | Gossip Protocol 208, Membership Protocol 212, Node Protocol 210, TCP/HTTP 204 |

A description of the function and operation of each of the protocols in the protocol suite 200 follows.

Transport Layer

The Transport Layer corresponds to layer 4 of the Open Systems Interconnection (OSI) model, and is responsible for providing reliable data transfer services between nodes to the cluster support, data synchronization, and application layers. The Transport Layer in the system 100 includes the UDP 202 and TCP/HTTP 204 protocols.

Cluster Support Layer

The Cluster Support Layer includes the protocols used to discover nodes, verify node existence, check node liveliness, determine whether a node is a member of one of the clusters 108, and determine how to route data between nodes.

Discovery Protocol 206

The Discovery protocol 206 is based on version 1.1 of the WS-Discovery protocol published by the Organization for the Advancement of Structured Information Standards (OASIS), the entirety of which is hereby incorporated by reference herein. In the depicted embodiment, XML formatting used in the published standard is replaced with Google™ Protobuf encoding.

The Discovery protocol 206 allows any node in the system 100 to identify the other nodes in the system 100 by multicasting Probe messages to those other nodes and waiting for them to respond. A node may alternatively broadcast a Hello message when joining the system 100 to alert other nodes to its presence without requiring those other nodes to first multicast the Probe message. Both the Probe and Hello messages are modeled on the WS-Discovery protocol published by OASIS.

Gossip Protocol 208

The Gossip protocol 208 is an epidemic protocol that disseminates data from one of the nodes to all of the nodes of that cluster 108 by randomly performing data exchanges between pairs of nodes in the cluster 108. The Gossip protocol 208 communicates liveliness by exchanging "heartbeat state" data in the form of a heartbeat count for each node, which allows nodes to determine when one of the nodes in the cluster 108 has left unexpectedly (e.g.: due to a server crash). The Gossip protocol 208 also communicates "application state" data such as top-level hashes used by the Consistency protocol 216 and status entity identifiers and their version numbers used by the Status protocol 218 to determine when to synchronize data between the nodes, as discussed in more detail below. The data spread using the Gossip protocol 208 eventually spreads to all of the nodes in the cluster 108 via periodic node to node exchanges.

A data exchange between any two nodes of the cluster 108 using the Gossip protocol 208 involves performing two remote procedure calls (RPCs) from a first node ("Node A") to a second node ("Node B") in the same cluster 108, as follows:

1. Node A sends a GreetingReq message to Node B, which contains a list of digests for all the nodes in the cluster 108 of which Node A is aware. For each node, a digest includes a unique node identifier and version information that is incremented each time either the heartbeat state or application state for that node changes. The version information may be, for example, a one-dimensional version number or a multi-dimensional version vector. Using a version vector allows the digest to summarize the history of the state changes that the node has undergone.

2. Node B sends a GreetingRsp message to Node A, which contains:

(a) a list of digests for nodes about which Node B wishes to receive more information from Node A, which Node B determines from the version information sent to it in the GreetingReq message;

(b) a list of digests for nodes about which Node A does not know form part of the cluster 108;

(c) a list of one or both of heartbeat and application states that will bring Node A up-to-date on nodes for which it has out-of-date information; and (d) a list of nodes that Node A believes form part of the cluster 108 but that Node B knows have been removed from the cluster 108.

3. Node A then sends a ClosureReq message to Node B, in which Node A sends:

(a) a list of digests for nodes about which Node A wishes to receive more information from Node B (e.g. Node A may request information for nodes of which Node A was unaware until Node B sent Node A the GreetingRsp message);

(b) a list of states that will bring Node B up-to-date on nodes for which it has out-of-date information; and (c) a list of nodes that Node B believes form part of the cluster 108 but that Node A knows have been removed from the cluster 108.

4. Node B then sends a ClosureRsp message to Node A, in which Node B sends:

(a) a list of states that will bring Node A up-to-date on nodes it is out-of-date on, in response to Node A's request in ClosureReq; and (b) a list of nodes that have been removed from the cluster 108 since GreetingRsp.

5. After Nodes A and B exchange RPCs, they will have identical active node lists, which include the latest versions of the heartbeat state and application state for all the nodes in the cluster 108 that both knew about before the RPCs and that have not been removed from the cluster 108.

Node Protocol 210

The Node protocol 210 is responsible for generating a view of the system 100's network topology for each node, which provides each node with a network map permitting it to communicate with any other node in the system 100. In some embodiments, the network map is a routing table. The network map references communication endpoints, which are an address (IP/FQDN), port number, and protocol by which a node can be reached over the IP network that connects the nodes.

The Node protocol 210 does this in three ways:
1. via a "Poke exchange", as described in further detail below;
2. via the Discovery protocol 206, which notifies the Node protocol 210 when a node joins or leaves the system 100. When a node joins the system 100 a "Poke exchange" is performed with that node; and
3. manually, in response to user input.

A Poke exchange involves periodically performing the following RPCs for the purpose of generating network maps for the nodes:
1. a Poke request, in which Node A sends to Node B a Node A self view and a list of other nodes known to Node A, as viewed by Node A, following which Node B updates its network map in view of this information; and
2. a Poke response, in which Node B sends to Node A a Node B self view and a list of other nodes known to Node B, as viewed by Node B, following which Node A updates its network map in view of this information.

The RPCs are performed over the TCP/HTTP protocol 204.

To reduce bandwidth usage, node information is only exchanged between Nodes A and B if the node information has changed since the last time it has been exchanged.

A Poke exchange is performed after the Discovery protocol 206 notifies the Node protocol 210 that a node has joined the system 100 because the Discovery protocol 206 advertises a node's communication endpoints, but does not guarantee that the node is reachable using those communication endpoints. For example, the endpoints may not be usable because of a firewall. Performing a Poke exchange on a node identified using the Discovery protocol 206 confirms whether the communication endpoints are, in fact, usable.

The Node protocol 210 can also confirm whether an advertised UDP communication endpoint is reachable; however, the Node protocol 210 in the depicted embodiment does not perform a Poke exchange over the UDP protocol 202.

For any given node in a cluster 108, a network map relates node identifiers to communication endpoints for each of the nodes in the same cluster 108. Accordingly, the other protocols in the protocol stack 200 that communicate with the Node protocol 210 can deliver messages to any other node in the cluster 108 just by using that node's node identifier.

Membership Protocol 212

The Membership protocol 212 is responsible for ensuring that each node of a cluster 108 maintains cluster membership information for all the nodes of the cluster 108, and to allow nodes to join and leave the cluster 108 via RPCs. Cluster membership information is shared between nodes of the cluster 108 using the Status protocol 218. Each node in the cluster 108 maintains its own version of the cluster membership information and learns from the Status protocol 218 the cluster membership information held by the other nodes in the cluster 108. As discussed in further detail below, the versions of cluster membership information held by two different nodes may not match because the version of cluster membership information stored on one node and that has been recently updated may not yet have been synchronized with the other members of the cluster 108.

For each node, the cluster membership information includes:
1. A membership list of all the nodes of the cluster 108, in which each of the nodes is represented by:
(a) the node identifier, which is unique among all the nodes in the system 100;
(b) the node's state, which is any one of:
(i) Discover: the node is a member of the cluster 108 but has not been synchronized with the other members of the cluster 108 since having booted;
(ii) Joining: the node is in the process of joining a cluster 108;
(iii) Syncing: the node is in the process of synchronizing data using the Synchrony, Consistency, and Status protocols 214,216,218 with the cluster 108 it has just joined;
(iv) Valid: the node has completed synchronizing the cluster membership information and is a valid node of the cluster 108; and
(v) Timed Out: the node has become unresponsive and is no longer an active member of the cluster 108 (the node remains a member of the cluster 108 until removed by a user);
(c) a session token;
(d) the version number of the cluster membership information when the node joined the cluster 108; and
(e) the version number of the cluster membership information the last time it was changed.
2. A gravestone list listing all the nodes that have been removed from the cluster 108, in which each removed node is represented by:
(a) that node's node identifier; and
(b) the version of that node's cluster membership information when the node was removed.

In the depicted embodiment, a node is always a member of a cluster 108 that comprises at least itself; a cluster 108 of one node is referred to as a "singleton cluster". Furthermore, while in the depicted embodiment the membership information includes the membership list and gravestone list as described above, in alternative embodiments (not depicted) the membership information may be comprised differently; for example, in one such alternative embodiment the membership information lacks a gravestone list, while in another such embodiment the node's state may be described differently than described above.

When Node A wants to act as a new server node and wants to join a cluster 108 that includes Node B, it communicates with Node B and the following occurs:
1. Node A sends a cluster secret to Node B, which in the depicted embodiment is a key that Node B requires before letting another node join its cluster 108. One of the clients 102 provides the cluster secret to Node A. As Node B controls Node A's access to the cluster 108, Node B acts as a "membership control node".
2. Nodes A and B exchange their membership information. The versions of the membership information on Nodes A and B are updated to include the node identifiers of Node A and of all the nodes of the cluster 108 that Node A is joining.
3. Node A's state is changed to "Joining" as Node A joins the cluster.
4. Once joined, Node A's state is changed to "Syncing" as data is exchanged between Node A and the cluster 108 it has just joined. Node B also updates the version of the membership information stored on the all the other nodes of the cluster 108 using the Status protocol 218. The process of updating the versions of the membership information stored on Node A and all the members of the cluster 108 that Node A is joining is referred to as "synchronizing" the versions of the membership information stored on all of these nodes.

5. After synchronization is complete, Node A's state changes to Valid.

Data Synchronization Layer

The Data Synchronization Layer includes the protocols that enable data to be sent between the nodes in a cluster with different ordering guarantees and performance tradeoffs. The protocols in the Data Synchronization Layer directly use protocols in the Transport and Cluster Support Layers.

Synchrony Protocol 214

The Synchrony protocol 214 is used to send data in the form of messages from Node A to Node B in the system 100 such that the messages arrive at Node B in an order that Node A can control, such as the order in which Node A sends the messages. Services that transfer data using the Synchrony protocol 214 run on dedicated high priority I/O service threads.

In the depicted embodiment, the Synchrony protocol 214 is based on an implementation of virtual synchrony known as the Totem protocol, as described in Agarwal D A, Moser L E, Melliar-Smith P M, Budhia R K, "The Totem Multiple-Ring Ordering and Topology Maintenance Protocol", ACM Transactions on Computer Systems, 1998, pp. 93-132, the entirety of which is hereby incorporated by reference herein. In the Synchrony protocol 214, nodes are grouped together into groups referred to hereinafter in this description as "Synchrony rings", and a node on any Synchrony ring can send totally ordered messages to the other nodes on the same ring. The Synchrony protocol 214 modifies the Totem protocol as follows:

1. The Synchrony protocol 214 uses both a service identifier and a ring identifier to identify a Synchrony ring. The service identifier identifies all instances of a given Synchrony ring, whereas the ring identifier identifies a particular instance of a given Synchrony ring. For example, each time a node joins or leaves a Synchrony ring that ring's ring identifier will change, but not its service identifier. The service identifier allows a node to multicast totally ordered messages to the group of nodes that share the same service identifier (i.e. the group of nodes that belong to the same Synchrony ring).

2. In the Totem protocol, in some cases when the nodes are not sending messages the Synchrony ring seen by nodes does not reflect the final ring configuration that converges when the nodes begin messaging. The Synchrony protocol 214 allows nodes to send probe messages to each other to cause Synchrony rings to converge prior to the sending of non-probe messages.

3. The Totem protocol only allows ordered messages to be sent to all nodes that form part of a Synchrony ring. In contrast, the Synchrony protocol 214 uses a Dispatch module that abstracts the network layer from the Synchrony protocol 214 by providing an interface to broadcast to all reachable nodes in the system 100; multicast to any set of nodes in the system 100 using a list of destination node identifiers; and to unicast to a single node in the system 100 using its node identifier. The Dispatch module also supports multiplexing of services on the same IP port using message filtering and routing by service identifier. Outgoing messages from a node are sent to the subset of nodes having the same service identifier unless multicast.

4. The Synchrony protocol 214 uses fragmented messages and user payload chunking and coalescing to address problems arising from the maximum transmission unit size of approximately 1,500 bytes.

5. The Synchrony protocol 214 modifies the way nodes use Join messages, which are messages nodes use in the Totem protocol to join a Synchrony ring:

(a) Join messages are sent by nodes only if they have the lowest node identifier in the current set of operational nodes in the Synchrony ring.

(b) Nodes that do not have the lowest node identifier in their operational set unicast Join messages to the nodes with the lowest node identifier in their operational set.

(c) Join messages include the service identifier, and nodes that are not part of the corresponding Synchrony ring do not respond.

Relative to the Totem protocol, these modifications help reduce aggregate bandwidth used by nodes to join Synchrony rings.

6. The Synchrony protocol 214 detects and blacklists nodes that are unable to join a Synchrony ring due to some types of network misconfigurations. For example, a node that is able to send to, but not receive messages from, the other nodes will appear to the other nodes to only ever send probe messages since all other messages in the present embodiment are solicited, and accordingly will be blacklisted.

7. The Synchrony protocol 214 performs payload encryption and authenticity verification of messages.

8. The Synchrony protocol 214 limits the time each node can hold the token used in the Totem protocol; in the depicted embodiment, each node can hold the token for 15 ms.

9. The Synchrony protocol 214 implements a TCP friendly congestion avoidance algorithm.

As discussed in more detail below, the system 100 uses the Synchrony protocol for the Shared Views and Collaboration application 222 and the Shared Events and Alarms application 224; the data shared between members of a cluster 108 in these applications 222 is non-persistent and is beneficially shared quickly and in a known order.

Consistency Protocol 216

The Consistency protocol 216 is used to automatically and periodically share data across all the nodes of a cluster 108 so that the data that is shared using the Consistency protocol 216 is eventually synchronized on all the nodes in the cluster 108. The types of data that are shared using the Consistency protocol 216 are discussed in more detail below in the sections discussing the Shared Settings application 226 and the Shared User Objects application 228. Data shared by the Consistency protocol 216 is stored in a database on each of the nodes, and each entry in the database includes a key-value pair in which the key uniquely identifies the value and the keys are independent from each other. The Consistency protocol 216 synchronizes data across the nodes while resolving parallel modifications that different nodes may perform on different databases. As discussed in further detail below, the Consistency protocol 216 accomplishes this by first being notified that the databases are not synchronized; second, finding out which particular database entries are not synchronized; and third, finding out what version of the entry is most recent, synchronized, and kept.

In order to resolve parallel modifications that determine when changes are made to databases, each node that joins a cluster 108 is assigned a causality versioning mechanism used to record when that node makes changes to data and to determine whether changes were made before or after changes to the same data made by other nodes in the cluster 108. In the present embodiment, each of the nodes uses an interval tree clock (ITC) as a causality versioning mechanism. However, in alternative embodiments other versioning mechanisms such as vector clocks and version vectors can be used. The system 100 also implements a universal time clock (UTC), which is synchronized between different nodes using Network Time Protocol, to determine the order in which changes are made when the ITCs for two or more nodes are identical. ITCs are described in more detail in P. Almeida, C. Baquero, and V. Fonte, "Interval tree clocks: a logical clock for dynamic systems", *Princi. Distri. Sys., Lecture Notes in Comp. Sci.*, vol. 5401, pp. 259-274, 2008, the entirety of which is hereby incorporated by reference herein.

The directory that the Consistency protocol 216 synchronizes between nodes is divided into branches, each of which is referred to as an Eventual Consistency Domain (ECD). The Consistency protocol 216 synchronizes each of the ECDs independently from the other ECDs. Each database entry within an ECD is referred to as an Eventual Consistency Entry (ECE). Each ECE includes a key; a timestamp from an ITC and from the UTC, which are both updated whenever the ECE is modified; a hash value of the ECE generating using, for example, a Murmurhash function; the data itself; and a gravestone that is added if and when the ECE is deleted.

The hash value is used to compare corresponding ECDs and ECEs on two different nodes to determine if they are identical. When two corresponding ECDs are compared, "top-level" hashes for those ECDs are compared. A top-level hash for an ECD on a given node is generated by hashing all of the ECEs within that ECD. If the top-level hashes match, then the ECDs are identical; otherwise, the Consistency protocol 216 determines that the ECDs differ. To determine which particular ECEs in the ECDs differ, hashes are taken of successively decreasing ranges of the ECEs on both of the nodes. The intervals over which the hashes are taken eventually shrinks enough that the ECEs that differ between the two nodes are isolated and identified. A bi-directional skip-list can be used, for example, to determine and compare the hash values of ECD intervals.

Two nodes that communicate using the Consistency protocol 216 may use the following RPCs:
1. SetEntries: SetEntries transmits new or updated ECEs to a node, which inserts them into the appropriate ECDs.
2. GetEntries: GetEntries transmits a key or a range of keys to a node, which returns the ECEs corresponding to those one or more keys.
3. SynEntries: SynEntries transmits a key or a range of keys to a node, and the two nodes then compare hashes of successively decreasing ranges of ECEs to determine which ECEs differ between the two nodes, as described above. If the ECEs differ, the nodes merge their ECEs so that the same ECEs are stored on the nodes by comparing the ITC timestamps; if the ITC timestamps match, the nodes compare the UTC timestamps associated with the ECEs. These timestamps act as version information that allows the two nodes to adopt the ECEs that have been most recently modified, as indicated by those ECEs' version information.

When a node changes ECEs, that node typically calls SynEntries to inform the other nodes in the cluster 108 that the ECEs have been changed. If some of the nodes in the cluster 108 are unavailable (e.g.: they are offline), then the Gossip protocol 208 instead of SynEntries is used to communicate top-level hashes to the unavailable nodes once they return online. As alluded to in the section discussing the Gossip protocol 208 in the cluster 108 above, each of the nodes holds its top-level hash, which is spread to the other nodes along with a node identifier, version information, and heartbeat state using the Gossip protocol 208. When another node receives this hash, it compares the received top-level hash with its own top-level hash. If the top-level hashes are identical, the ECEs on both nodes match; otherwise, the ECEs differ.

If the ECEs differ, regardless of whether this is determined using SynEntries or the Gossip protocol 208, the node that runs SynEntries or that receives the top-level hash synchronizes the ECEs.

Status Protocol 218

As discussed above, the Gossip protocol 208 shares throughout the cluster 108 status entity identifiers and their version numbers ("status entity pair") for nodes in the cluster 108. Exemplary status entity identifiers may, for example, represent different types of status data in the form of status entries such as how much storage the node has available; which devices (such as the non-node cameras 114) are connected to that node; which clients 102 are connected to that node; and cluster membership information. When one of the nodes receives this data via the Gossip protocol 208, it compares the version number of the status entity pair to the version number of the corresponding status entry it is storing locally. If the version numbers differ, the Status protocol 218 commences an RPC ("Sync RPC") with the node from which the status entity pair originates to update the corresponding status entry.

A status entry synchronized using the Status protocol 218 is uniquely identified by both a path and a node identifier. Unlike the data synchronized using the Consistency protocol 216, the node that the status entry describes is the only node that is allowed to modify the status entry or the status entity pair. Accordingly, and unlike the ECDs and ECEs synchronized using the Consistency protocol 216, the version of the status entry for Node A stored locally on Node A is always the most recent version of that status entry.

If Node A modifies multiple status entries simultaneously, the Status protocol 218 synchronizes all of the modified status entries together to Node B when Node B calls the Sync RPC. Accordingly, the simultaneously changed entries may be dependent on each other because they will be sent together to Node B for analysis. In contrast, each of the ECEs synchronized using the Consistency protocol 216 is synchronized independently from the other ECEs, so ECEs cannot be dependent on each other as Node B cannot rely on receiving entries in any particular order.

Applications

Each of the nodes in the system 100 runs services that implement the protocol suite 200 described above. While in the depicted embodiment one service is used for each of the protocols 202-218, in alternative embodiments (not depicted) greater or fewer services may be used to implement the protocol suite 200. Each of the nodes implements the protocol suite 200 itself; consequently, the system 100 is distributed and is less vulnerable to a failure of any single node, which is in contrast to conventional physical security systems that use a centralized server. For example, if one of the nodes fails in the system 100 ("failed node"), on each of the remaining nodes the service running the Status protocol 218 ("Status service") will determine that the failed node is offline by monitoring the failed node's heartbeat state and will communicate this failure to the service running the Node and Membership protocols 210,212 on each of the other nodes ("Node service" and "Membership service", respectively). The services on each node implementing the Synchrony and Consistency protocols 214,216 ("Synchrony service" and "Consistency service", respectively) will subsequently cease sharing data with the failed node until the failed node returns online and rejoins its cluster 108.

The following describes the various applications 220-230 that the system 100 can implement. The applications 220-230 are various embodiments of the exemplary method for sharing data 800 depicted in FIG. 8. The method 800 begins at block 802 and proceeds to block 804 where a first node in the system 100 accesses a node identifier identifying another node in the system 100. Both the first and second nodes are members of the same server cluster 108. All system information (device, server, etc.) is obtainable from the system information application 230. The node identifier that the first node accesses is part of the cluster membership information that identifies all the members of the cluster 108. The cluster membership information is accessible by all the members of the cluster 108. In the depicted embodiments each of the members of the cluster 108 stores its own version of the cluster membership information persistently and locally; however, in alternative embodiments (not depicted), the cluster membership information may be stored one or both of remotely from the nodes and in a central location. After accessing the node identifier for the second node, the first node sends the data to the second node at block 806, following which the method 800 ends at block 808. For example, when using the Node service described above, the Synchrony and Consistency services running on the first node are able to send the data to the second node by using the second node's node identifier, and by delegating to the Node service responsibility for associating the second node's communication endpoint to its node identifier. Sending the data from the first node to the second node at block 806 can comprise part of a bi-directional data exchange, such as when data is exchanged in accordance with the Gossip protocol 208.

Shared Settings Application 226 and Shared User Objects Application 228

During the system 100's operation, persistently stored information is transferred between the nodes of a cluster 108. Examples of this real-time information that the shared settings and shared user objects applications 226,228 share between nodes are shared settings such as rules to implement in response to system events such as an alarm trigger and user objects such as user names, passwords, and themes. This type of data ("Consistency data") is shared between nodes using the Consistency protocol 216; generally, Consistency data is data that does not have to be shared in real-time or in total ordering, and that is persistently stored by each of the nodes. However, in alternative embodiments (not depicted), Consistency data may be non-persistently stored.

Figure 3:
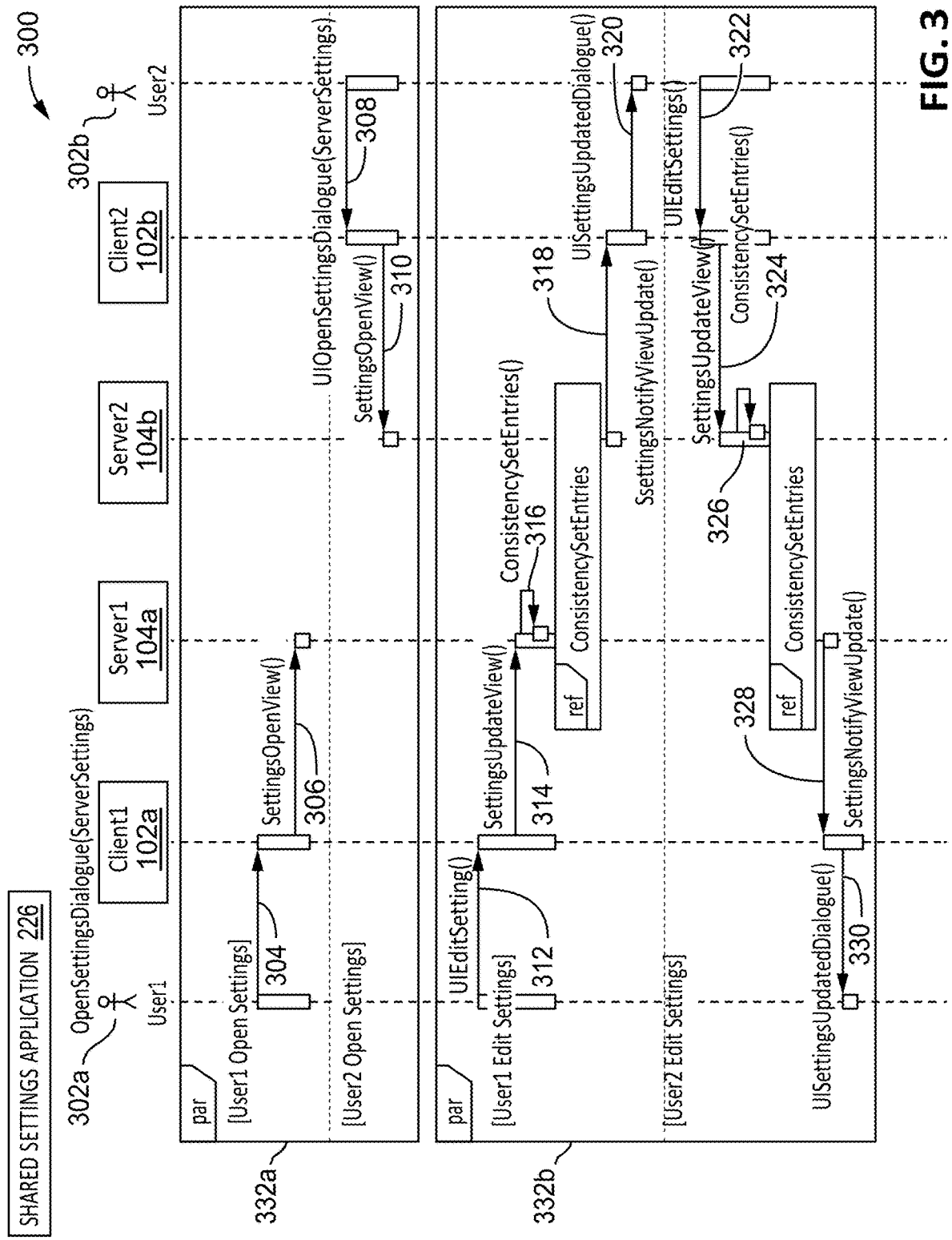
FIG. 3 is a UML sequence diagram showing how the system of FIG. 1 shares settings between different system users.

FIG. 3 shows a UML sequence diagram 300 in which Consistency data in the form of a user settings are shared between first and second users 302a,b (collectively, "users 302"). The users 302, the first and second clients 102a,b, and the first and second servers 104a,b, which are the first and second nodes in this example, are objects in the diagram 300. The servers 104a,b form part of the same cluster 108a. As the servers 104a,b with which the clients 102a,b communicate are not directly connected to each other, the Consistency protocol 216 is used to transfer data between the two servers 104a,b, and thus between the two users 302. Although the depicted embodiment describes sharing settings, in an alternative embodiment (not depicted) the users 302 may analogously share user objects.

The diagram 300 has two frames 332a,b. In the first frame 332a, the first user 302a instructs the first client 102a to open a settings panel (message 304), and the client 102a subsequently performs the SettingsOpenView( ) procedure (message 306), which transfers the settings to the first server 104a. Simultaneously, the second user 302b instructs the second client 102b analogously (messages 308 and 310). In the second frame 332b, the users 302 simultaneously edit their settings. The first user 302a edits his settings by having the first client 102a run UIEditSetting( ) (message 312), following which the first client 102a updates the settings stored on the first server 104a by having the first server 104a run SettingsUpdateView( ) (message 314). The first server 104a then runs ConsistencySetEntries( ) (message 316), which performs the SetEntries procedure and which transfers the settings entered by the first user 302a to the second server 104b. The second server 104b then sends the transferred settings to the second client 102b by calling SettingsNotifyViewUpdate( ) (message 318), following which the second client 102b updates the second user 302b (message 320). Simultaneously, the second user 302b analogously modifies settings and sends those settings to the first server 104a using the Consistency protocol 216 (messages 322, 324, 326, 328, and 330). Each of the servers 104a,b persistently stores the user settings so that they do not have to be resynchronized between the servers 104a,b should either of the servers 104a,b reboot.

Shared Events and Alarms Application 224

During the system 100's operation, real-time information generated during runtime is transferred between the nodes of a cluster 108. Examples of this real-time information that the shared events and alarms application 224 shares between nodes are alarm state (i.e. whether an alarm has been triggered anywhere in the system 100); system events such as motion having been detected, whether a device (such as one of the node cameras 106) is sending digital data to the rest of the system 100, whether a device (such as a motion detector) is connected to the system 100, whether a device is currently recording, whether an alarm has occurred or has been acknowledged by the users 302, whether one of the users 302 is performing an audit on the system 100, whether one of the servers 104 has suffered an error, whether a device connected to the system has suffered an error, whether a point-of-sale text transaction has occurred; and server node to client notifications such as whether settings/data having changed, current recording state, whether a timeline is being updated, and database query results. In the present embodiment, the data transferred between nodes using the Synchrony protocol 214 is referred to as "Synchrony data", is generated at run-time, and is not persistently saved by the nodes.

Figure 4:
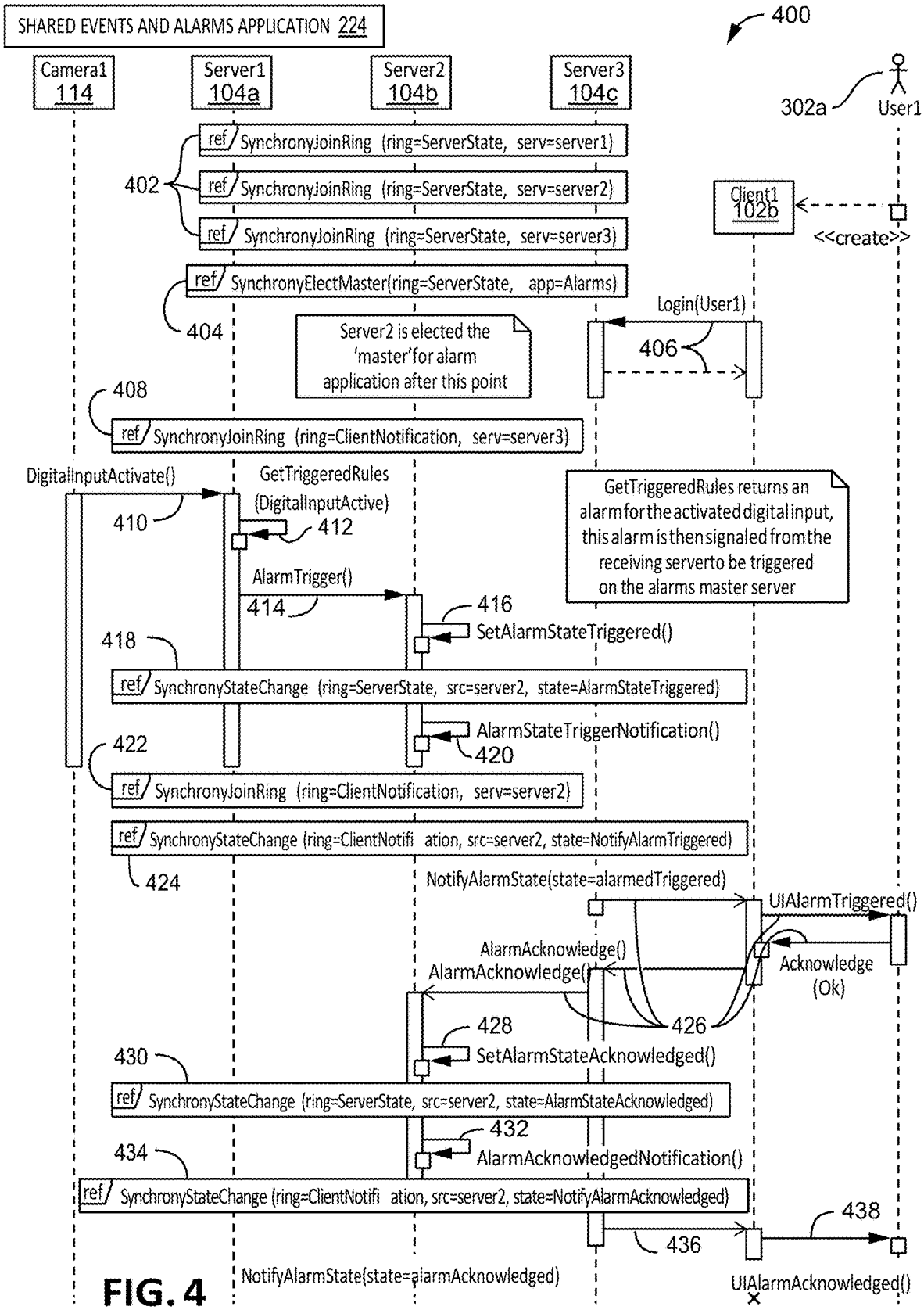
FIG. 4 is a UML sequence diagram showing how the system of FIG. 1 shares a state between different system users.

FIG. 4 shows a UML sequence diagram 400 in which an alarm notification is shared between the servers 104 using the Synchrony protocol 214. The objects in the diagram 400 are one of the non-node cameras 114, the three servers 104 in the first cluster 108a, and the second client 102b, which is connected to one of the servers 104c in the first cluster 108a.

At the first three frames 402 of the diagram 400, each of the servers 104 joins a Synchrony ring named "ServerState" so that the state of any one of the servers 104 can be communicated to any of the other servers 104; in the depicted embodiment, the state that will be communicated is "AlarmStateTriggered", which means that an alarm on one of the servers 108 has been triggered by virtue of an event that the non-node camera 114 has detected. At frame 404, the second server 104b is elected the "master" for the Alarms application; this means that it is the second server 104b that determines whether the input from the non-node camera 114 satisfies the criteria to transition to the AlarmStateTriggered state, and that sends to the other servers 104*a,c* in the Synchrony ring a message to transition them to the AlarmStateTriggered state as well.

The second user 302*b* logs into the third server 104*c* after the servers 104 join the ServerState Synchrony ring (message 406). Subsequent to the user 302*b* logging in, the third server 104*c* joins another Synchrony ring named "ClientNotification"; as discussed in further detail below, this ring is used to communicate system states to the user 302*b*, whereas the ServerState Synchrony ring is used to communicate only between the servers 104. The non-node camera 114 sends a digital input, such as an indication that a door or window has been opened, to the first server 104*a* (message 410), following which the first server 104*a* checks to see whether this digital input satisfies a set of rules used to determine whether to trigger an alarm in the system 100 (message 412). In the depicted embodiment, the second first server 104*a* determines that an alarm should be triggered, and accordingly calls AlarmTrigger( ) which alerts the second server 104*b* to change states. The second server 104 then transitions states to AlarmStateTriggered (message 416) and sends a message to the ServerState Synchrony ring that instructs the other two servers 104*a,c* to also change states to AlarmStateTriggered (frame 418). After instructing the other servers 104*a,c*, the second server 104*b* runs AlarmTriggerNotification( ) (message 420), which causes the second server 104*b* to also join the ClientNotification Synchrony ring (frame 422) and pass a message to the ClientState Synchrony ring that causes the third server 104*c*, which is the other server on the ClientState Synchrony ring, to transition to a "NotifyAlarmTriggered" state (frame 424). Once the third server 104*c* changes to this state it directly informs the second client 102*b* that the alarm has been triggered, which relays this message to the second user 302*b* and waits for the user second 302*b* to acknowledge the alarm (messages 426). Once the second user 302*b* acknowledges the alarm, the second server 104*b* accordingly changes states to "AlarmStateAcknowledged" (message 428), and then sends a message to the ServerState Synchrony ring so that the other two servers 104*a,c* correspondingly change state as well (frame 430). The second server 104*b* subsequently changes state again to "NotifyAlarmAcknowledged" (message 432) and sends a message to the third server 104*c* via the ClientNotification Synchrony ring to cause it to correspondingly change state (frame 434). The third server 104*c* then notifies the client 102*c* that the system 100 has acknowledged the alarm (message 436), which relays this message to the second user 302*b* (message 438).

In an alternative embodiment (not depicted) in which the second server 104*b* fails and can no longer act as the master for the Synchrony ring, the system 100 automatically elects another of the servers 104 to act as the master for the ring. The master of the Synchrony ring is the only server 104 that is allowed to cause all of the other nodes on the ring to change state when the Synchrony ring is used to share alarm notifications among nodes.

Figure 7:
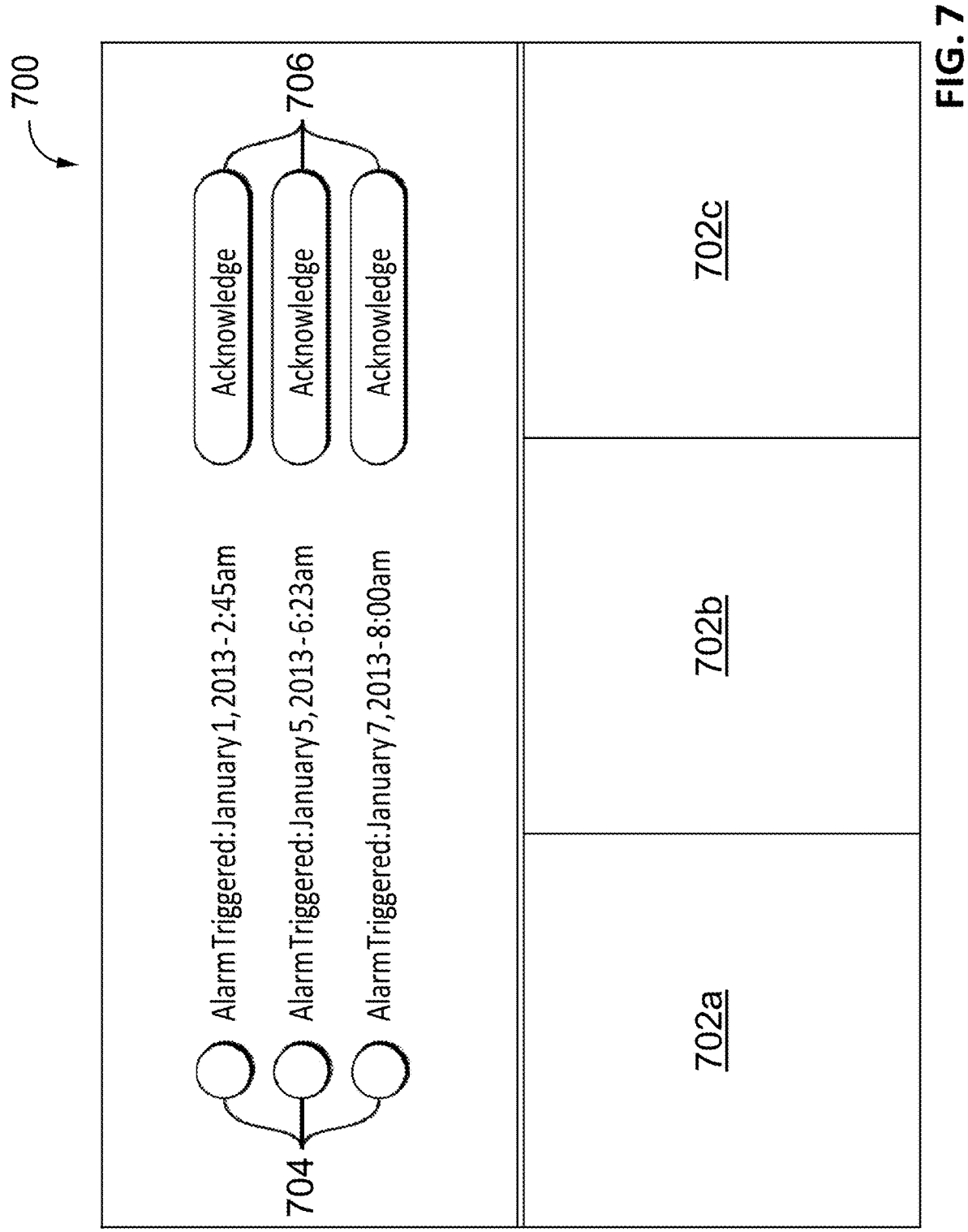
FIG. 7 is a view seen by a user of the system of FIG. 1.
Figure 8:
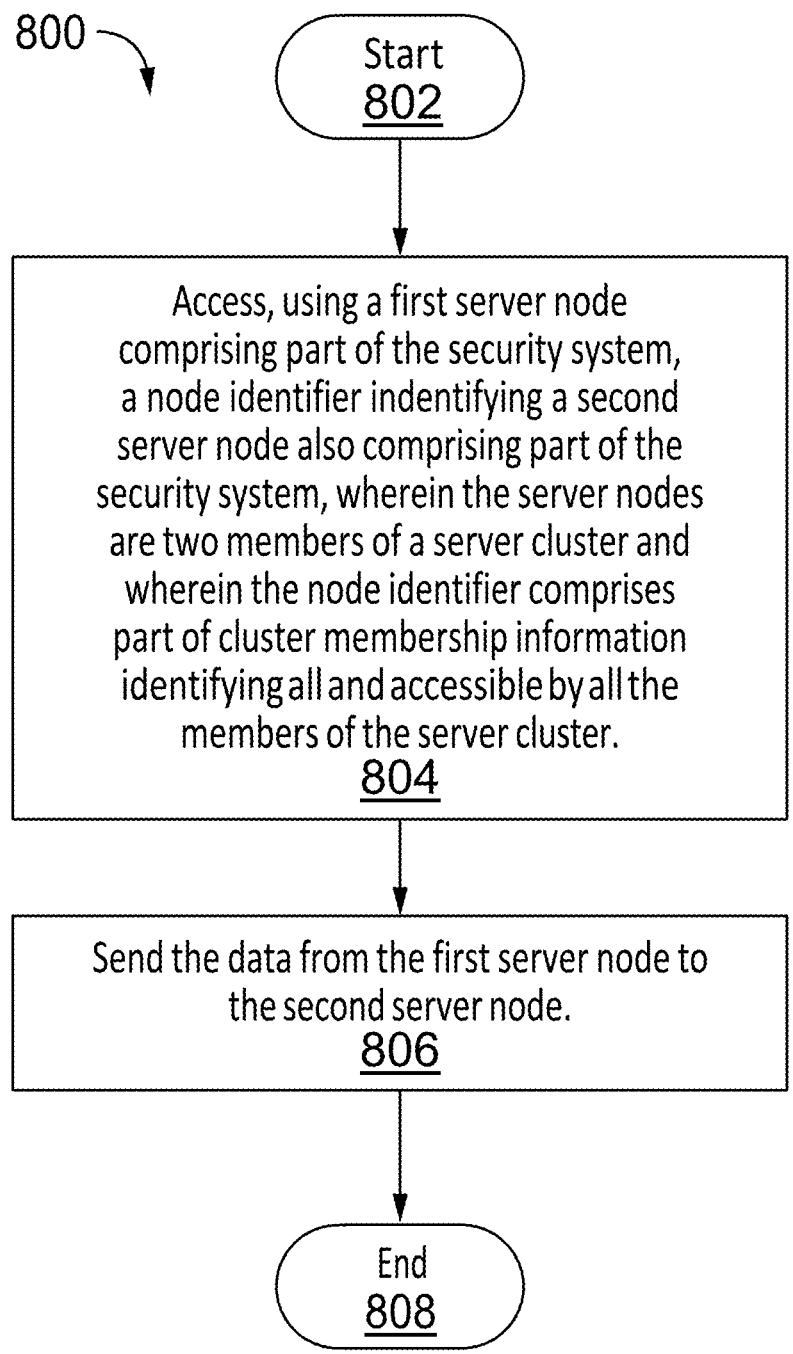
FIG. 8 is a method for sharing data in a physical security system, according to another embodiment.
Figure 9:
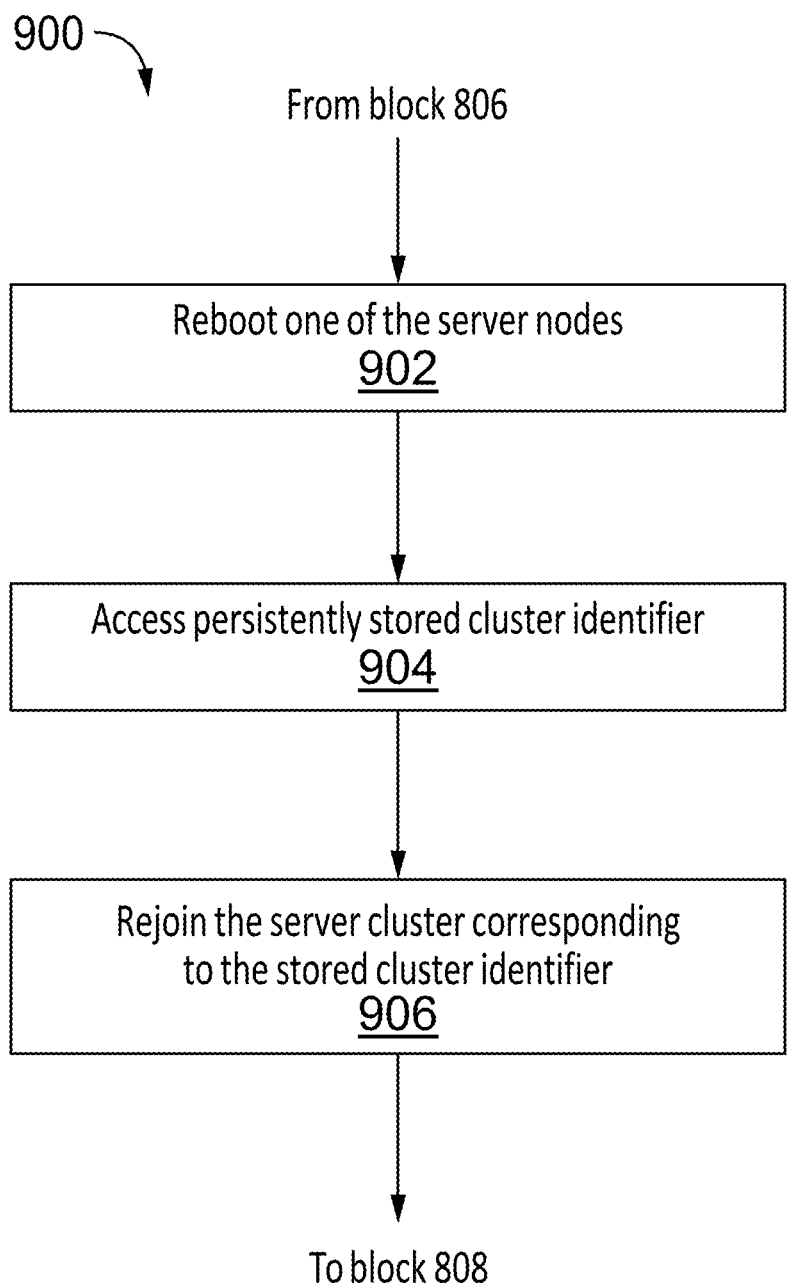
FIG. 9 is a method for automatically rejoining a cluster, according to another embodiment.

FIG. 7 shows an exemplary view 700 presented to the users 302 when acknowledging an alarm state in accordance with the diagram 400 of FIG. 4. The view 700 includes video panels 702*a-c* (collectively "panels 702") showing real time streaming video from the non-node camera 114; alerts 704 indicating that an alarm has been triggered as a result of what the non-node camera 114 is recording; and an acknowledge button 706 that the second user 302*b* clicks in order to acknowledge the alarm having been triggered.

Shared Views and Collaboration Application 222

The users 302 of the system 100 may also want to share each other's views 700 and collaborate, such as by sending each other messages and talking to each other over the system 100, while sharing views 700. This shared views and collaboration application 222 accordingly allows the users 302 to share data such as view state and server to client notifications such as user messages and share requests. This type of data is Synchrony data that is shared in real-time.

Figure 5:
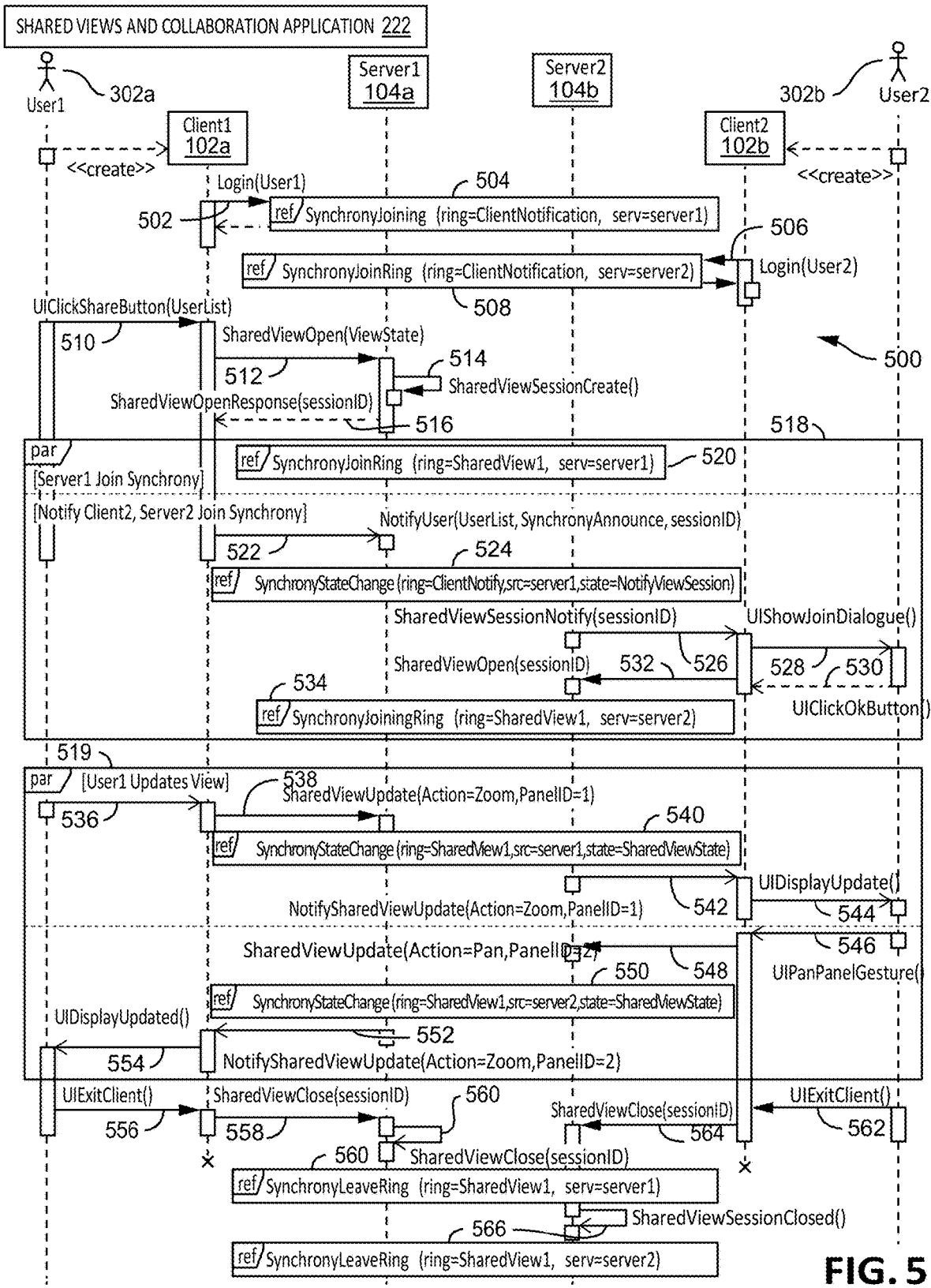
FIG. 5 is a UML sequence diagram showing how the system of FIG. 1 shares a view between different system users.

FIG. 5 shows a UML sequence diagram 500 in which views 700 are shared between the users 302 using the Synchrony protocol 214. The diagram 500 includes six objects: the first and second users 302*a,b*, the first and second clients 102*a,b* to which the first and second users 302*a,b* are respectively connected, and the first and second servers 104*a,b* to which the first and second clients 102*a,b* are respectively connected.

The first user 302*a* logs into the first server 104*a* via the first client 102*a* (message 502), following which the first server 104*a* joins the ClientNotification Synchrony ring (frame 504). Similarly, the second user 302*b* logs into the second server 104*b* via the second client 102*b* (message 506), following which the second server 104*b* also joins the ClientNotification Synchrony ring (frame 508).

The first user 302*a* then instructs the first client 102*a* that he wishes to share his view 700. The first user 302*a* does this by clicking a share button (message 510), which causes the first client 102*a* to open the view 700 to be shared ("shared view 700") on the first server 104*a* (message 512). The first server 104*a* creates a shared view session (message 514), and then sends the session identifier to the first client 102*a* (message 516).

At one frame 518 each of the clients 102 joins a Synchrony ring that allows them to share the shared view 700. The first server 104*a* joins the SharedView1 Synchrony ring at frame 520. Simultaneously, the first client 106*a* instructs the first server 104*a* to announce to the other server 104*b* via the Synchrony protocol 214 that the first user 302*a*'s view 700 can be shared by passing to the first server 104*a* a user list and the session identifier (message 522). The first server 104*a* does this by sending a message to the second server 104*b* via the ClientNotify Synchrony ring that causes the second server 104 to change to a NotifyViewSession state. In the NotifyViewSession state, the second server 104*b* causes the second client 106*b* to prompt the second user 302*b* to share the first user 302*a*'s view 700 (messages 526 and 528), and the second user 302*b*'s affirmative response is relayed back to the second server 104*b* (messages 530 and 532). The second server 104*b* subsequently joins the SharedView1 Synchrony ring, which is used to share the first user 302*a*'s view 700.

At a second frame 519 the users 106 each update the shared view 700, and the updates are shared automatically with each other. The first user 302*a* zooms into a first panel 702*a* in the shared view 700 (message 536), and the first client 102*a* relays to the first server 104*a* how the first user 302*a* zoomed into the first panel 702*a* (message 538). The first server 104*a* shares the zooming particulars with the second server 104*b* by passing them along the SharedView1 Synchrony ring (frame 540). The second server 104*b* accordingly updates the shared view 700 as displayed on the second client 106*b* (message 542), and the updated shared view 700 is then displayed to the second user 302*b* (message 544). Simultaneously, the second user 302*b* pans a second panel 702*b* in the shared view 700 (message 546), and the second client 102*b* relays to the second server 104*b* how the second user 302*b* panned this panel 702*b* (message 548).

The second server 104b then shares the panning particulars with the first server 104a by passing them using the SharedView1 Synchrony ring (frame 550). The first server 104a accordingly updates the shared view 700 as displayed on the first client 106b (message 552), and the updated shared view 700 is then displayed to the first user 302a (message 556).

After the second frame 519, the first user 302a closes his view 700 (message 556), which is relayed to the first server 104a (message 558). The first server 104a consequently leaves the SharedView1 Synchrony ring (message and frame 560). The second user 302b similarly closes his view 700, which causes the second server 104b to leave the SharedView1 Synchrony ring (messages 562 and 564, and message and frame 566).

In the example of FIG. 5, the users 302 pan and zoom the shared view 700. In alternative embodiments (not depicted) the users 302 may modify the shared view 700 in other ways. For example, the users 302 may each change the layout of the panels 702; choose whether video is to be displayed live or in playback mode, in which case the users 302 are also able to pause, play, or step through the video; and display user objects such as maps or web pages along with information about the user object such as revision history. In these alternative embodiments, examples of additional state information that is synchronized using a Synchrony ring include whether a video is being played, paused, or stepped through and the revision history of the user object.

Figure 12:
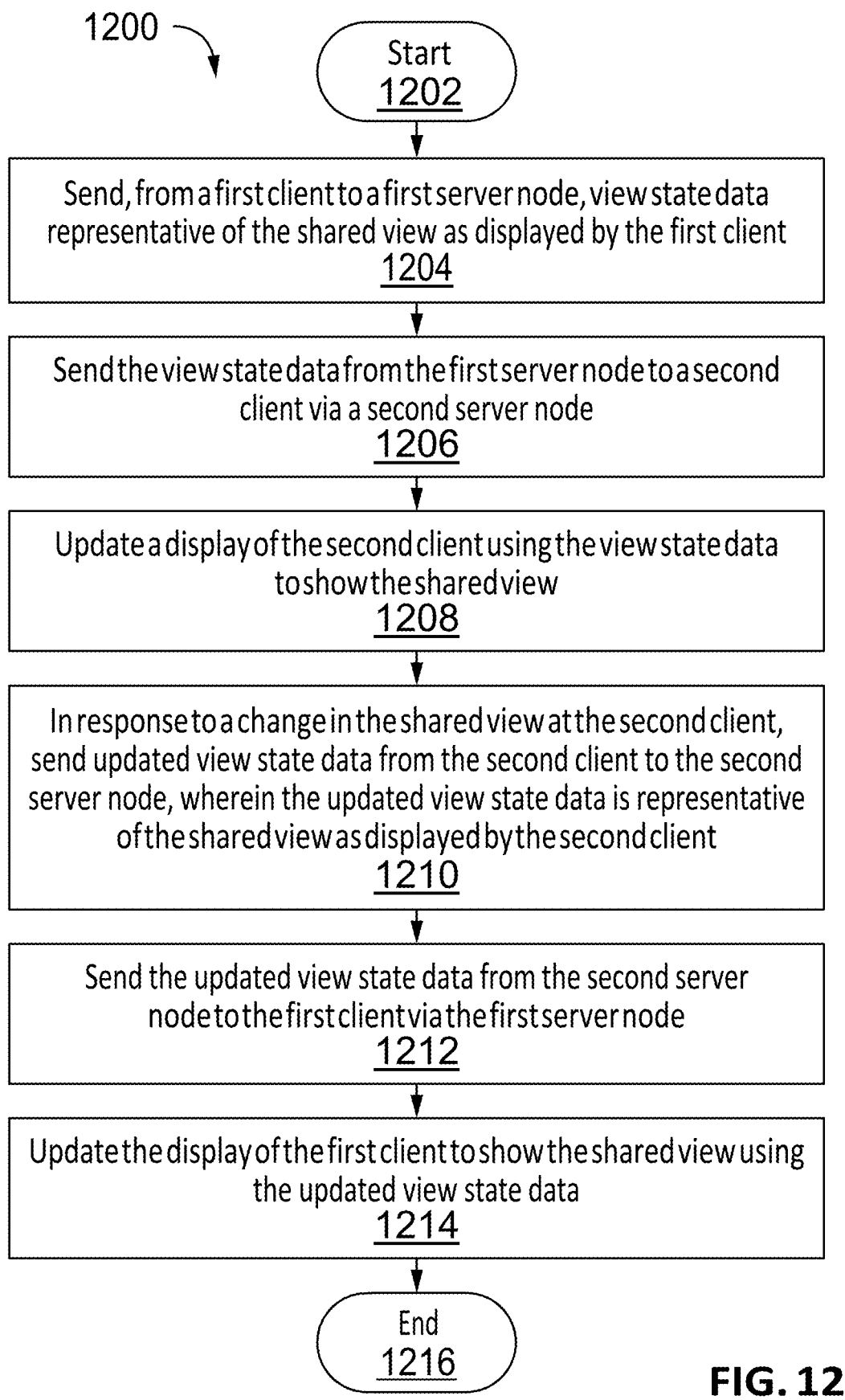
FIG. 12 is a method for sharing a view using a physical security system that comprises a plurality of server nodes, according to another embodiment.

While the discussion above focuses on the implementation of the shared views and collaboration application 222 in the peer-to-peer physical security system 100 of FIG. 1, more generally this application 222 may be implemented in a physical security system that has multiple servers 104, such as a federated system that includes a centralized gateway server. An example of this more general embodiment is shown in FIG. 12, which depicts an exemplary method 1200 for sharing a view using a physical security system that comprises a plurality of server nodes. The method 1200 begins at block 1202 and proceeds to block 1204, where view state data representative of the view displayed by the first client (such as the first client 102a), which is the view to be shared, is sent from the first client to a first server node (such as the first server 104a and the view state data sent via message 538). At block 1206 the view state data is relayed from the first server node to a second client (such as the second client 102b) via a second server node (such as the second server 104b and the view state data sent via frame 540 and message 542). At block 1208 the second client then updates a display using the view state data to show the shared view (such as via message 544). In response to a change in the shared view at the second client, such as a change resulting from interaction with a user at the second client (such as via message 546), at block 1210 updated view state data is sent from the second client to the second server node (such as via message 548). The updated view state data is representative of the shared view as displayed by the second client. The updated view state data is sent from the second server node to the first client via the first server node at block 1212 (such as via frame 550 and message 552), and at block 1214 the first client's display is then updated to show the shared view as it was modified at the second client using the updated view state data (such as via message 554). The method 1200 ends at block 1216. In an alternative embodiment such as when dealing with a federated system that uses a centralized gateway server, all the view state data may be routed through that centralized server.

Unattended View Sharing Application 225

The users 302 of the system 100 may also want to be able to see and control a view on a display that is directly connected to one of the servers 104 that the users 302 do not directly control (i.e., that the users 302 control via other servers 104) (this display is an "unattended display", and the view on the unattended display is the "unattended view"). For example, the unattended display may be mounted on a wall in front of the users 302 and be connected to the server cluster 108 via one of the servers 104 in the cluster 108, while the users 302 may be connected to the server cluster 108 via other servers 104 in the cluster 108. As discussed below with respect to FIG. 10, the unattended view sharing application 225 permits the users 302 to view and control the unattended view notwithstanding that none of the users 302 is directly connected to the server 104 controlling the unattended view. The view data exchanged between the servers 104 to enable this functionality is Synchrony data that is shared in real-time.

FIG. 10 shows a UML sequence diagram 1000 in which the unattended view is shared with the first user 302a using the Synchrony protocol 214. The diagram 1000 includes six objects: the first user 302a, the first client 102a to which the first user 302a is connected and that includes a display ("client display") with which the first user 302a interacts, the first and second servers 104a,b, a monitor instance 1004 running on hardware such as an unattended one of the clients 102 connected to both the second server 104b and the unattended display, and an administrator 1002 who sets up the monitor instance 1004.

In FIG. 10, the administrator 1002 creates the monitor instance 1004 (message 1006) and the monitor instance 1004 then automatically logs into the second server 104b (messages 1008 and 1010). The monitor instance 1004 makes the unattended view available to the second server 104b by calling SharedViewOpen(viewState) on the second server 104, where viewState is view state data indicative of the unattended view (message 1012). Following this the second server 104b creates a shared view session (message 1014) by running SharedViewSessionCreate( ) and then sends the corresponding session identifier to the monitor instance (message 1016). After receiving the session identifier the monitor instance 1004 joins the SharedView1 Synchrony ring 10 (frame 1018), which is used to transmit view state data to and from the other servers 104 in the cluster 108 that are also members of the SharedView1 Synchrony ring.

After joining the SharedView1 Synchrony ring, the monitor instance 1020 publishes a notification to the other servers 104 in the cluster 108 that the unattended view is available to be seen and controlled. The monitor instance 1020 does this by calling RegisterMonitor(sessionid) on the second server 104b (message 1018), which causes the session identifier related to the unattended view to be registered in a view directory (frame 1022). The view directory is shared with the other servers 104 in the cluster 108 using the Consistency protocol 216.

Once the view directory is disseminated to the other servers 104 in the 20 cluster 108, those other servers 104 can access the view directory to determine which unattended views are available to view and control. After the first server 104a receives the view directory, the first user 302a via the first client 102a logs into the first server 104a, thereby gaining access to the cluster 108 (messages 1024) and the view directory. The first user 102a instructs the first client 102a to display the unattended view by calling UIDisplayMonitor(sessionId) (message 1026), which causes the first client 102a to send the unattended view's session identifier to the first server 104a with instructions to open the unattended view (message 1028). The first server 104a acknowledges the instructions of the first client 102a (message 1030) and then joins the SharedView1 Synchrony ring (frame 1032) in order to automatically receive view state data describing the current view of the unattended display (message 1034) and to automatically stay apprised of any subsequent changes to the unattended view.

The first user 302a subsequently pans one of the panels of the unattended view as it is displayed on the client display (message 1036), and the first client 102a relays the panning action and the identity of the particular panel that is panned to the first server 104a by calling Shared ViewUpdate (action=pan, panelId=2) (message 1038). The first server 104a sends updated view state data to all the servers 104 that are members of the SharedView1 Synchrony ring (frame 1040), which allows all of those servers 104 to reproduce the updated version of the unattended view. The second server 104b receives this updated view state data and relays it to the monitor instance 1004 by calling NotifySharedViewUpdate (action=pan, params, panelId=2) (message 1042). The monitor instance 1004 then updates the unattended display to show the unattended view as modified by the first user 302a (message 1044).

In the example of FIG. 10, the first user 302a pans one of the panels of the unattended view. In alternative embodiments (not depicted) the first user 302a may modify the unattended view in other ways. For example, the first user 302a may change the layout of any one or more of the unattended view's panels; choose whether video is to be displayed live or in playback mode, in which case the first user 302a is also able to pause, play, or step through the video; and display user objects such as maps or web pages along with information about the user object such as revision history. In these alternative embodiments, examples of additional state information that is synchronized using a Synchrony ring include whether a video is being played, paused, or stepped through and the revision history of the user object.

In another alternative embodiment (not depicted), the unattended view sharing application 225 may be used to create an aggregate display comprising a matrix of n×m unattended displays. For example, where n=m=2 and there are consequently four unattended displays, the first user 302a may control all four of the unattended displays simultaneously to create one, large virtual display. A single video can then be enlarged such that each of the unattended views is of one quadrant of the video, thereby allowing the video to be enlarged and shown over the four unattended displays. In this embodiment, the monitor instances 1004 for the unattended displays may be communicative with the server cluster 108 via any of one to four of the servers 104.

While FIG. 10 shows only the first user 302a, in alternative embodiments (not depicted) more than one of the users 302 can see and control the unattended view by also joining the SharedView1 Synchrony ring. In the above example of the aggregated display comprising the n×m matrix of unattended displays, the aggregated display can be mounted in the room for simultaneous viewing several of the users 302 with each of the users 302 having the ability to control each of the unattended views.

While the discussion above focuses on the implementation of the unattended view sharing application 225 in the peer-to-peer physical security system 100 of FIG. 1, more generally this application 225 may be implemented in a physical security system that has multiple servers 104, such as a federated system that includes a centralized gateway server. An example of this more general embodiment is shown in FIG. 11, which depicts an exemplary method 1100 for interacting with the unattended display in a physical security system comprising multiple server nodes. The method begins at block 1102 and proceeds to block 1104 where a second server node (such as the second server 104b) that is communicative with the unattended display sends to a first server node (such as the first server 104a) view state data indicative of the unattended view (such as via the Synchrony ring at frames 1020 and 1032 of FIG. 10). The method 1100 then proceeds to block 1106 where at least a portion of the unattended view is displayed on the client display (such as the update of the client display that results from message 1034 of FIG. 10). In an alternative embodiment such as when dealing with a federated system that uses a centralized gateway server, all the view state data may be routed through that centralized server.

Cluster Streams Application 220

Figure 6:
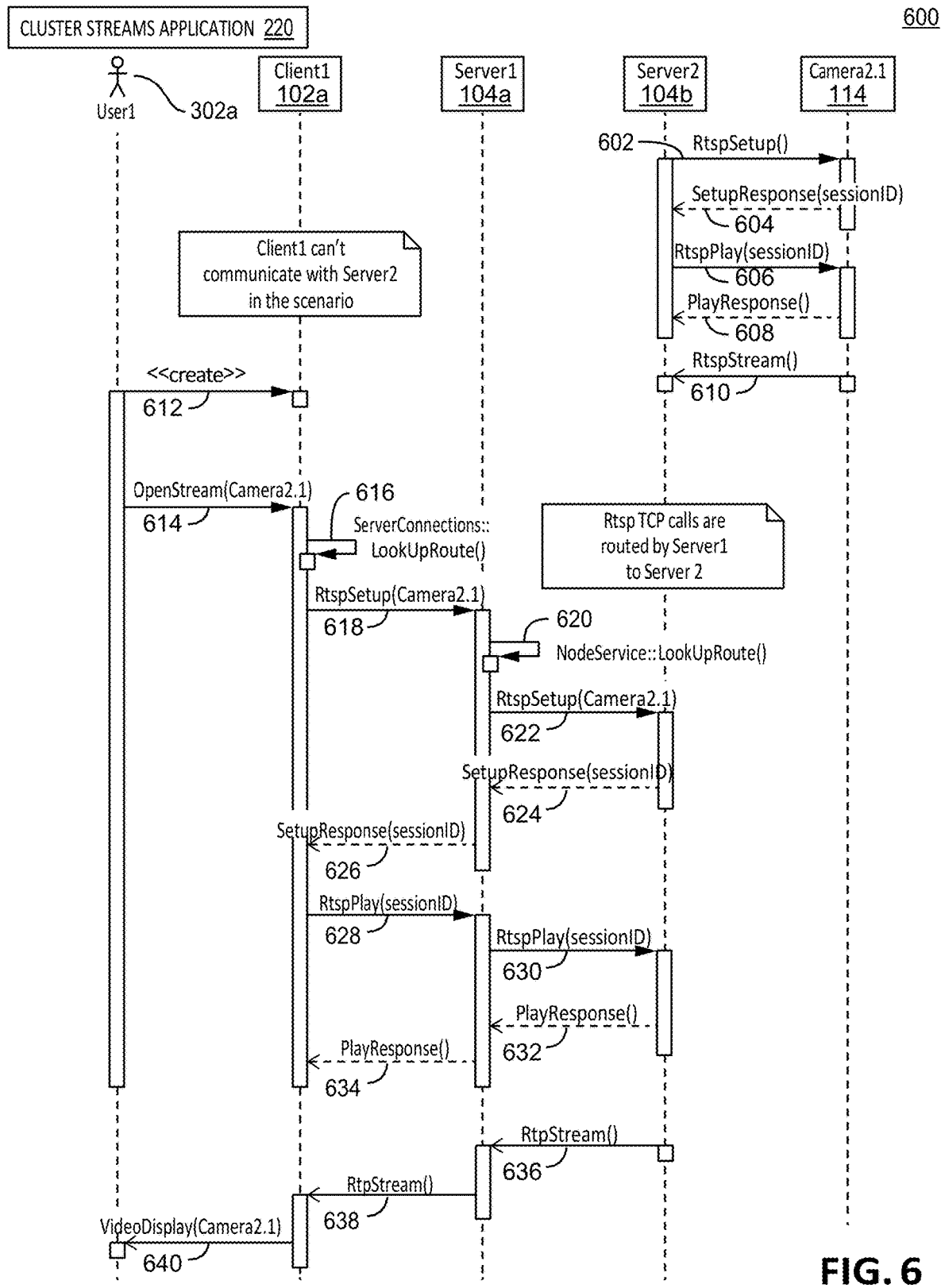
FIG. 6 is a UML sequence diagram showing how the system of FIG. 1 shares streams between different system users.

One of the users 302 may also want to stream video from one of the cameras 106,114 if a point-to-point connection between that user 302 and that camera 106,114 is unavailable; the cluster streams application 220 enables this functionality. FIG. 6 shows a UML sequence diagram 500 in which video is streamed from the non-node camera 114 to the first user 302a through the first and second servers 104a,b and the first client 102a. The UML diagram has five objects: the first user 302a, the first client 102a, the first and second servers 104a,b, and the non-node camera 114. The first client 102a can directly communicate with the first server 104a, but cannot directly communicate with the second server 104b. However, the first and second servers 104a,b can communicate directly with each other. Additionally, while the second server 104b and the non-node camera 114 can communicate directly with each other, the first server 104a and the non-node camera 114 cannot directly communicate.

The second server 104b first establishes a session with the non-node camera 114 so that video is streamed from the non-node camera 114 to the second server 104b. The second server 104b first sets up a Real Time Streaming Protocol (RTSP) session with the non-node camera 114 (messages 602 and 604), and instructs the non-node camera 114 to send it video (messages 606 and 608). The non-node camera 114 subsequently commences streaming (message 610).

The first user 302a establishes a connection with the first client 102a (message 612) and then instructs the first client 102a to open a window showing the streaming video (message 614). The first client 102a then calls LookupRoute( ) to determine to which server 104 to connect; because the first client 102a cannot connect directly to the second server 104b, it sets up an RTSP connection with the first server 104a (message 618). The first server 104b then calls LookupRoute( ) to determine to which node to connect to access the real-time video, and determines that it should connect with the second server 104b (message 620). The first server 104a subsequently sets up an RTSP connection with the second server 104b (message 622), and the second server 104b returns a session identifier to the first server 104a (message 624). The first server 104a relays the session identifier to the first client 102a (message 626). Using this session identifier, the first client 102a instructs the second server 104b to begin playing RTSP video (messages 628 to 634), and the second server 104b subsequently streams video to the first user 302a via the second server 104b, then the first server 104a, and then the first client 102a (messages 636 to 640).

While FIG. 6 illustrates routing video from one of the non-node cameras 114 connected to one of the servers 104 in a cluster 108 to other servers 104 in the same cluster 108, in alternative embodiments (not depicted) video may also be routed from one of the node cameras 106 in a cluster 108 through the other node cameras 106 in the same cluster 108.

Rebooting

In the present embodiment, the cluster membership information is persistently stored locally on each of the nodes. When one of the nodes reboots, it automatically rejoins the cluster 108 of which it was a member prior to rebooting. This is depicted in the exemplary method 900 shown in FIG. 8. After performing block 806, one of the nodes in the cluster 108 reboots (block 902). Upon rebooting, this node accesses the persistently stored cluster membership information that identifies the cluster 108 of which it was a member prior to rebooting (block 904), and subsequently rejoins this cluster 108 (block 906) before returning to block 808. Having the nodes automatically rejoin a cluster 108 following rebooting is beneficial in that it helps the system 100 recover following restarting of any one or more of its servers. As each of the nodes persistently stores the Consistency information, upon rejoining the cluster 108. only that Consistency information that has changed since the node last left the cluster 108 is synchronized again, thereby saving bandwidth.

While certain exemplary embodiments are depicted, alternative embodiments, which are not depicted, are possible. For example, while in the depicted embodiment the node cameras 106 and non-node cameras 114 are distinct from each other, in alternative embodiments (not depicted) a single camera may be simultaneously a node camera and a non-node camera. For example, in FIG. 1 the first camera 106a is a node that is a member of the third cluster 108c; however, if the first camera 106a were also directly coupled to the fifth server 104e but retained only its cluster membership information for the third cluster 108c, the first camera 106a would remain a member of the third cluster 108c while simultaneously acting as a non-node camera 114 from the perspective of the fifth server 104e.

The processor used in the foregoing embodiments may be, for example, a microprocessor, microcontroller, programmable logic controller, field programmable gate array, or an application-specific integrated circuit. Examples of computer readable media are non-transitory and include disc-based media such as CD-ROMs and DVDs, magnetic media such as hard drives and other forms of magnetic disk storage, semiconductor based media such as flash media, random access memory, and read only memory.

It is contemplated that any part of any aspect or embodiment discussed in this specification can be implemented or combined with any part of any other aspect or embodiment discussed in this specification.

For the sake of convenience, the exemplary embodiments above are described as various interconnected functional blocks. This is not necessary, however, and there may be cases where these functional blocks are equivalently aggregated into a single logic device, program or operation with unclear boundaries. In any event, the functional blocks can be implemented by themselves, or in combination with other pieces of hardware or software.

Figure 13:
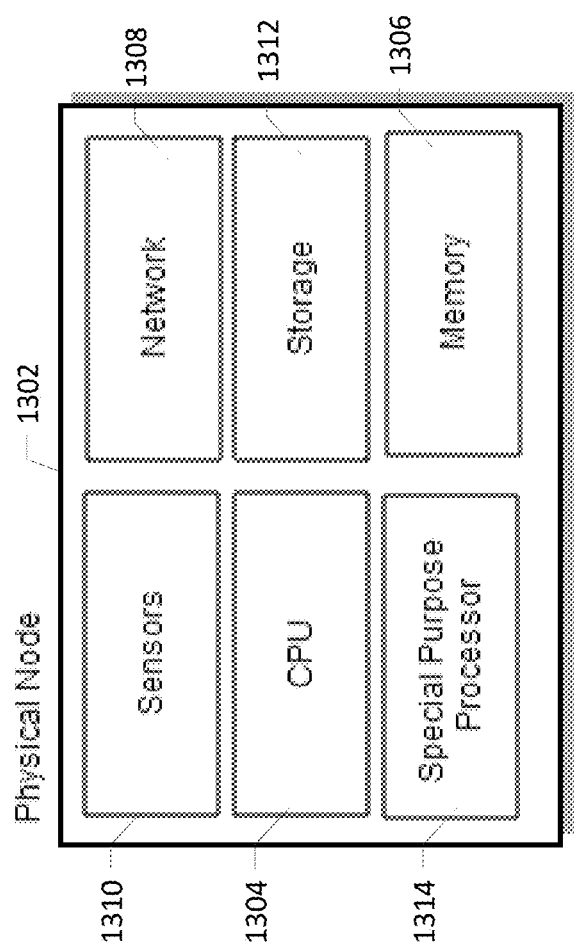
FIG. 13 illustrates an exemplary node in a security system.

FIG. 13 illustrates a compute node 1302 in a system for physical security. Node 1302 may be a physical node comprising a stand-alone computer, an embedded device, such as a surveillance camera, network switch, or may be a virtual node implemented in a virtual computing environment that shares a physical node with other virtual nodes. Node 1302 may contain a CPU 1304, memory 1306 and networking capabilities 1308. Node 1302 may or may not also include sensors 1310 (such as surveillance cameras), storage 1312, and special purpose processing units 1314 that improve efficiency of certain compute-intensive tasks. Special purpose processing units may include a graphic processing unit (GPU), a vector processing unit or other type of math co-processor, an analytics engine, a compression, decompression, or format transcoding co-processor, and an encryption or decryption co-processor.

For example, storage 1312 may be persistent, non-transitory storage for computer instructions that implement the various protocols and methods described herein, such as the protocols of FIG. 2 and methods of FIGS. 17-21. CPU 1304 may execute such instructions when copied into memory 1306.

Systems for physical security can be logically partitioned into entities called sites, and these sites can be organized into larger organizational hierarchies. Sites may correspond to certain physical locations. For example, each site may include sensors and compute nodes from one physical building or part of a building, or a site may be determined by network proximity or accessibility. Within a site, connected nodes can self-organize into hierarchies based on capability and availability.

Figure 14:
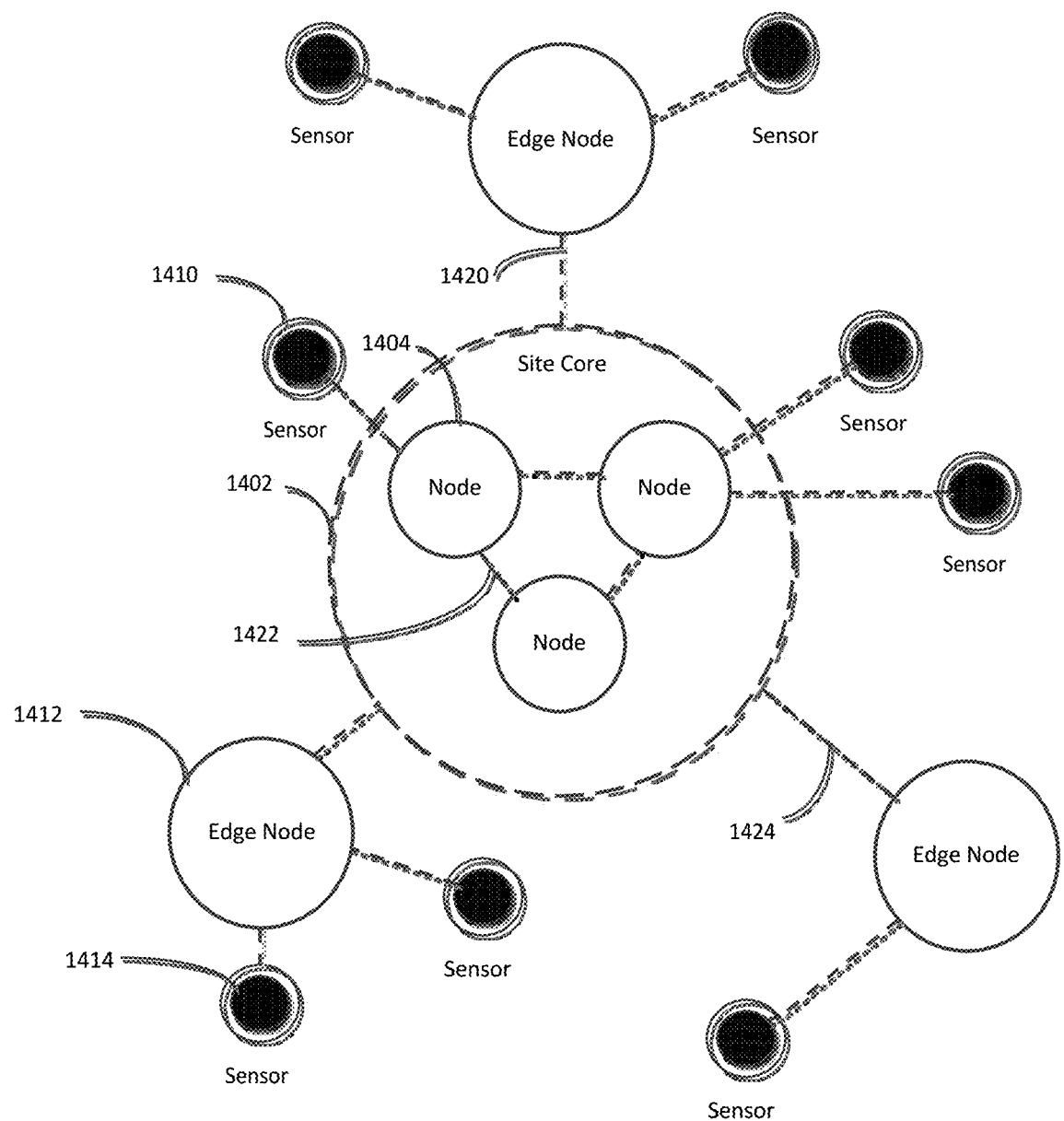
FIG. 14 illustrates a two-tier model of compute nodes that comprise a single site.

FIG. 14 illustrates a two-tier model of compute nodes that comprise a single site of a physical security system, such as a single building. A core tier may consist of a highly available, highly connected set of core nodes 1404, within the site core 1402. An edge tier may consist of edge nodes 1412, which may be less reliable, less well connected, or less capable than the core nodes 1404 communicating with the core 1402. The core network connections 1422 between core nodes 1404 within the core may be more reliable than the edge network connections such as 1420. For example, network connections 1422 may be a local area network (LAN) such as Ethernet, and edge network connections 1420 may be a wide area network (WAN) such as an Internet connection or a cellphone data connection. Edge network connections such as 1424 can also be more reliable connections such as a LAN; a less reliable connection is just one of many reasons an edge node may be classified separately from core nodes. Security sensors may be connected to core nodes or edge nodes. For example, sensor 1410 is connected to core node 1404, while sensor 1414 is connected to edge node 1412. Sensor data from a sensor may be recorded on storage within the compute node the sensor is attached to, for example data from sensor 1414 may be recorded on edge node 1412. Or sensor data may be recorded elsewhere within the site, for example within any network attached storage (NAS) (not pictured). Because of differences in network connection reliability or bandwidth, the edge node sensors may more reliably have sensor data recorded on the local node, while core node sensors may more reliably have sensor data recorded anywhere within the core.

Clients are not shown in the model above. Each node in the designated site may be capable of hosting a front-end user interface that models the entire site as a single logical entity to connected clients. A client may only need to have connectivity with any single core or edge compute node in the site to use all functionality in the site as node-node service and data routing are supported.

In a Video Management Software (VMS) application model, the node front-ends present sites to VMS clients as a flat list of video sensor IDs without any hierarchy. Nodes and other sensor types are excluded from the default user view and only exposed in setup and configuration views. End users can organize the video sensors into logical hierarchies in the VMS that are independent of the physical structure and relationship of the nodes. Virtual sensors can also be created by configuring associations between audio sensors and video sensors for example. The physical hierarchy and physical nodes are exposed in VMS setup pages allowing end-users to override the system organization to optimize behavior or configure the services provided by the nodes.

Figure 15:
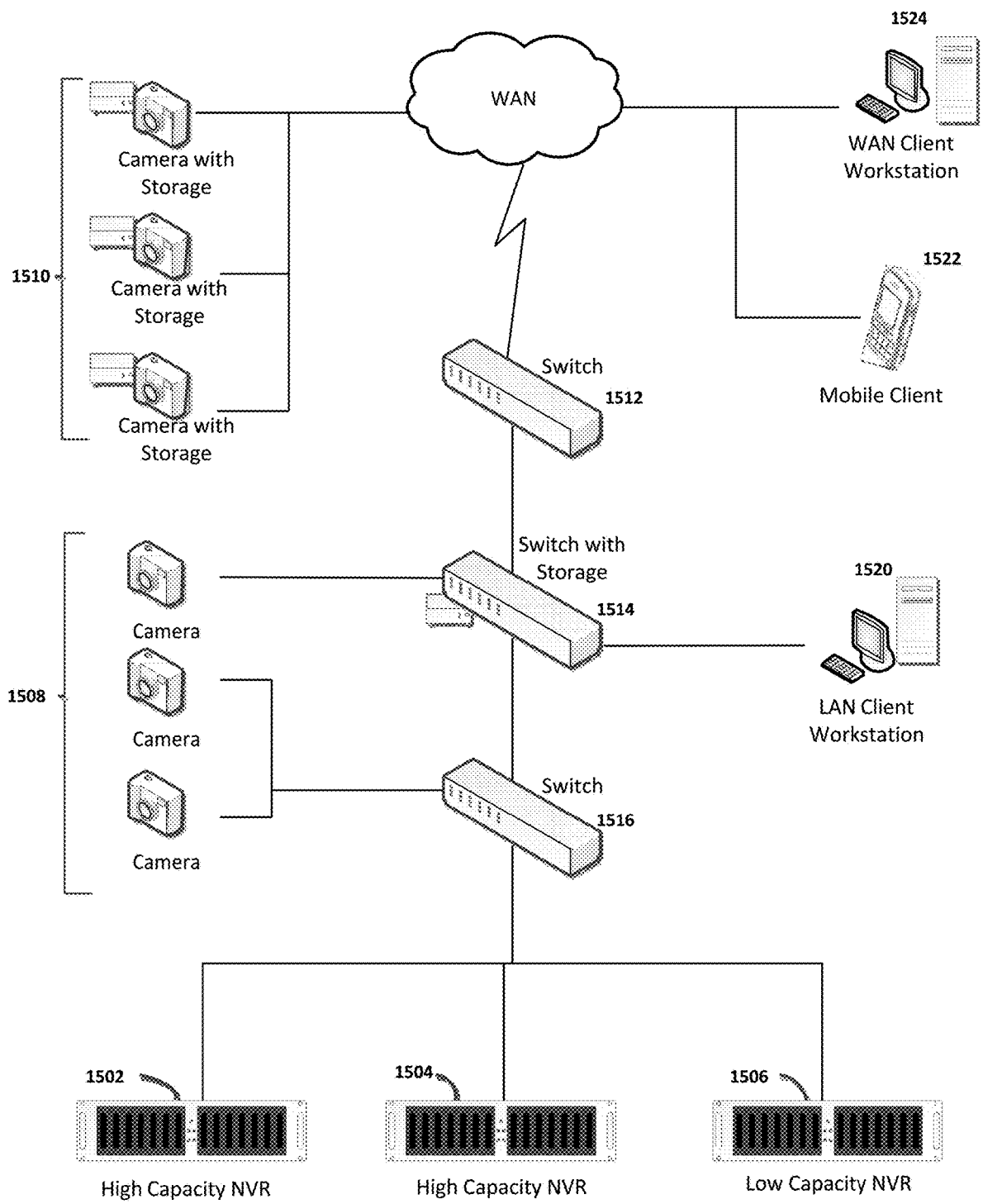
FIG. 15 illustrates a physical model representing a site for a Video Management System (VMS) application.

The presentation and logical organization of the site may be different depending on the application supported for the front-end. FIG. 15 illustrates an exemplary physical model representing a site for a VMS application. The site-core comprises nodes that are high-capacity network video recorders (NVRs) 1502 and 1504 with an enterprise license connected to a high-capacity, high-availability LAN between switches 1512, 1514, and 1516. Node 1506 is a low capacity NVR, and may also be lower capability as compared to NVR 1502 and 1504, with a core license and without the capability to support as many clients. Switch 1514 includes storage and may have an embedded license and the ability to provide limited services. Edge nodes consist of cameras with on-board storage 1510 and camera sensors 1508 without storage. Cameras 1508 without storage are connected to the high-speed LAN, while cameras with storage 1510 are connected to a lower-speed and lower-reliability WAN. Client devices can be conned to the WAN, such as client workstation 1524 and mobile client 1522, or to the LAN, such as client workstation 1520. Cameras with storage 1510 may have an embedded license and be able to provide limited compute node services.

In other site configurations (not depicted), a site can also consist of a single node, single-core with no edge nodes, or many thousands of edge-nodes managed by a cluster of core nodes. Sites are assumed to logically model a set of devices co-located at a single physical location, for example, a store, airport, casino, or corporation headquarters.

Figure 16:
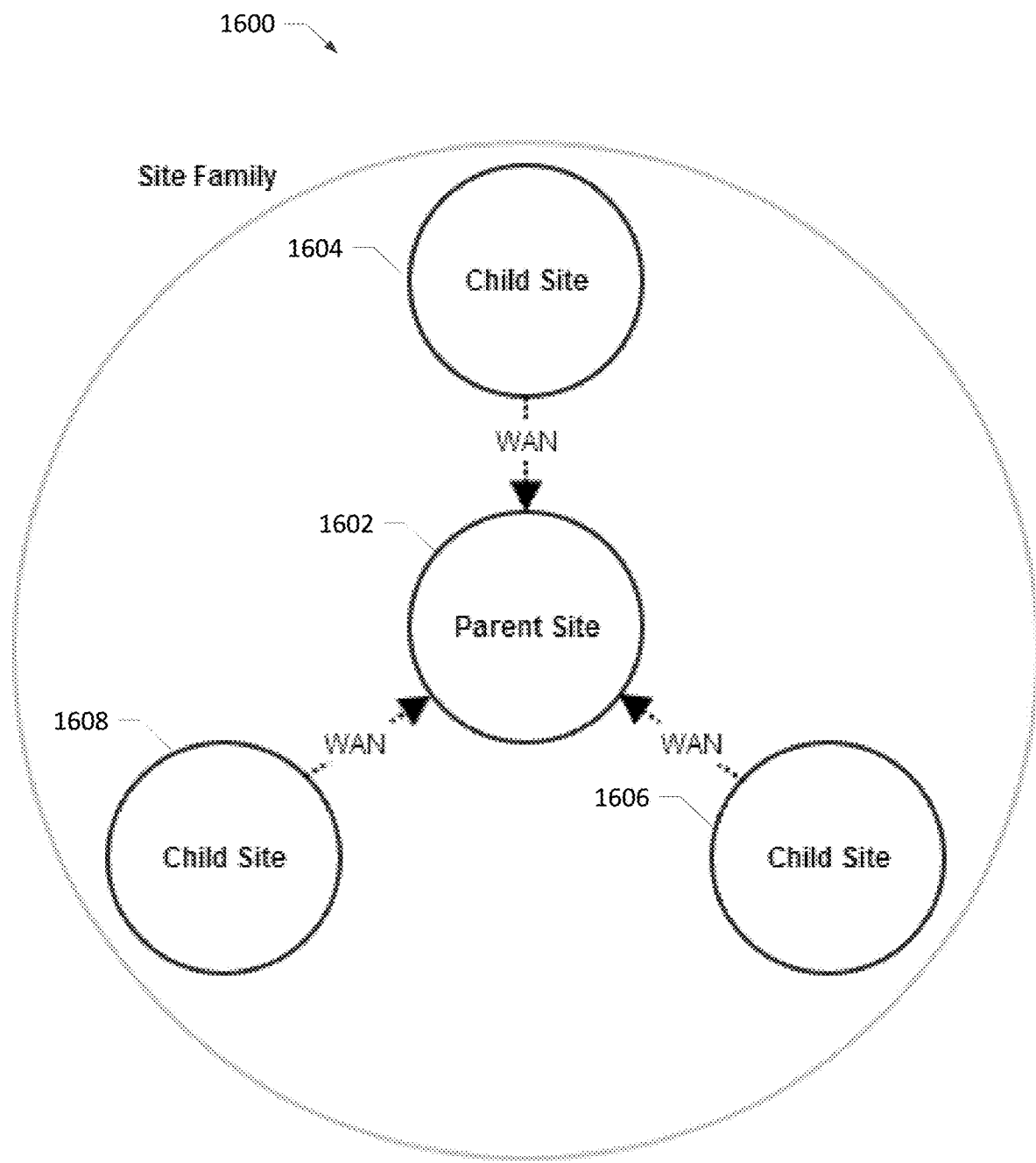
FIG. 16 illustrates an example site hierarchy.

There are cases where an organization has a need to monitor sensors deployed to many sites and manage those as a single system. To facilitate multi-site deployments, a site family software platform supports hierarchical organization of sites to form larger groups (site-families). FIG. 16 illustrates an example site hierarchy 1600 consisting of a parent site 1602 and several child sites 1604, 1606, and 1608 connected over a wide-area network. Child sites 1604, 1606, and 1608 communicate with a designated parent site 1602 for global configuration settings such as Access Control Lists (ACLs) for multi-site users. In one embodiment, a peer-to-peer model is not used in the site-family model because the child sites may not be located at physically secured locations and may not be trusted not to be compromised from a security standpoint. Having a single parent site 1602 allows that site 1602 to be physically secured against compromise and provides a location to store the most sensitive information such as the credentials of users with super-user access to all sites. ACLs can also be enforced by the parent for child-sites independently, preventing any child site from accessing restricted information, regardless of user-privilege levels.

Child Sites 1604, 1606, and 1608 can be loosely connected and continue to operate independently in the absence of connectivity to the parent site 1602. Sites or site-families may also be connected to cloud service platforms. Cloud services might include off-site archiving of critical sensor data, hosted metadata analysis, system reports, single-point client-access, or any other services that augment the platform capability.

Node, Site, and Multi-Site models allow users to configure and manage systems at the appropriate scopes in an intuitive way. For example, policies or configuration can be defined at the site-level to only apply to a particular site or at the multi-site level if they apply to all sites.

A hierarchical model enables limiting the size of site and global directories as compared with a non-hierarchical model with a flat directory. System setup may be simplified by a hierarchical model as compared to a non-hierarchical model because self-configuration and assembly within a child site can be based on simple rules and/or user constraints. Self-configuration is described further below with reference to FIG. 19.

Figure 17:
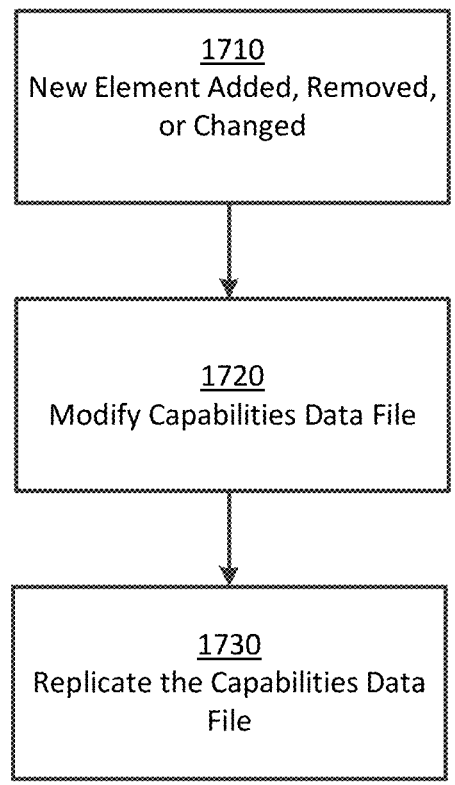
FIG. 17 is a flow chart of an exemplary method for discovery and distribution of device capabilities.

FIG. 17 is a flow chart of an exemplary method for discovery and distribution of device capabilities. In step 1710, a new element is added, removed, or changed in a way that changes its capabilities. The new element may be, for example, a sensor, a network segment, a compute node, or any element of a physical security system for which capabilities are communicated or tracked. For example, a new sensor may be added, the storage quantity of a compute node may change by a new hard disk, or a wireless network segment may be replaced by wired Ethernet. A node capability may also change when the node's load changes because the current remaining capacity has changed. An added element may be discovered by an end user notifying the system, or by an automated system such as the discovery protocol 206 of FIG. 2. In step 1720, a copy of the capabilities directory is modified to include the discovered addition, removal, or change in capabilities, and then those changes are further replicated to all other nodes with copies of the capabilities directory. Discovery and replication of changes of the full capabilities directory is provided by means of the status protocol 218 of FIG. 2. The node 210 and discovery protocols, 206 of FIG. 2, may also disseminate condensed versions of the capabilities directory containing condensed descriptions in the form of roles, essential services and scalar priorities values that should be communicated prior to authentication. For example, client applications would use the node information to determine if login and authentication services are supported by a node. After login is completed and the client is authenticated, the client would learn of the detailed capabilities roles, services, and priorities of other nodes via the status protocol or by directly contacting the authenticated services at each node.

Figure 18:
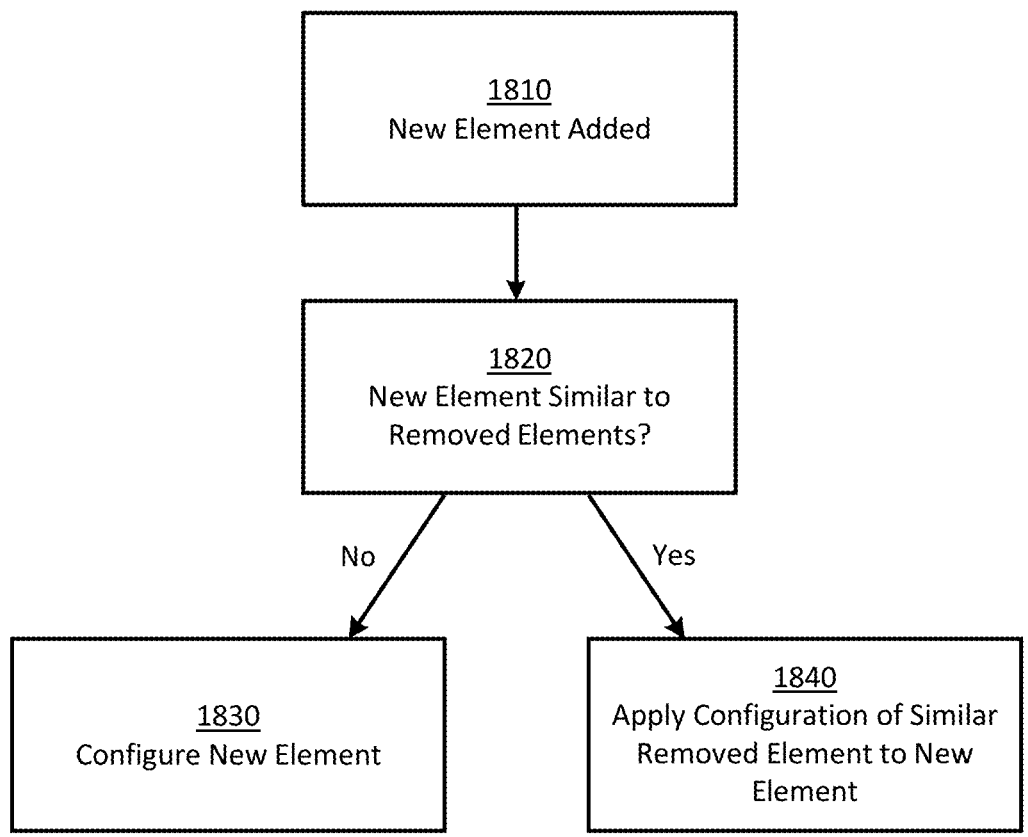
FIG. 18 is a flowchart of an exemplary method for device replacement.

FIG. 18 is a flowchart of an exemplary method for device replacement. In step 1810, a new element is added. The element may be, for example, a sensor, compute node, network link, or other element of a physical security system requiring configuration. The new element may be discovered by a user notifying the system of the new element, or the new element may be discovered automatically, for example, by a protocol such as the discovery protocol 206 of FIG. 2. After discovering the new element, in step 1820 the new element is compared to removed elements with known attributes, to determine if the new element is similar in some aspect to removed elements. The comparison can be based on any known attributes of the removed element, such as a user friendly name given to the element, the removed element's physical or network location, type or class of element, capabilities of the element, or time between removal of the old element and addition of the new element. If the new element is determined to be wholly dissimilar to a removed element, then in step 1830 the element is configured normally as a new unknown element. However, if the element is determined to be sufficiently similar to a removed element, the new element may be considered to be a replacement of the removed element. If an element is elected as a replacement, either by the end-user, or automatically based on similarity, the compatible configuration parameters for the old element are assigned to the new element. Additionally, shared system configuration parameters which reference the old element are updated to point to the new element. Examples of such parameters in a surveillance application are user-privileges, access-rights, maps, rules, and alarms. For elements that generate data and metadata such as surveillance cameras, data and metadata recorded from the old element may also be updated to reference the new element.

Similarity may be determined in Step 1820 based on a single attribute, such as a user-chosen name of a device, or based on multiple attributes. Comparison of individual attributes may be binary in nature (e.g. attribute is the same or not), or have a range of comparison values (e.g. the time between removal and replacement may be considered a scalar value ranging up from zero). The method of combining results of attribute comparisons may be based on binary logic, based on an algorithm such as a weighted average of scalar values, or a combination of logic and algorithm. As a simple example, a newly added element may be considered sufficiently similar to a removed camera only if the new element is a camera, has a similar network location, and the time since removal of the old camera is below a threshold.

Figure 19:
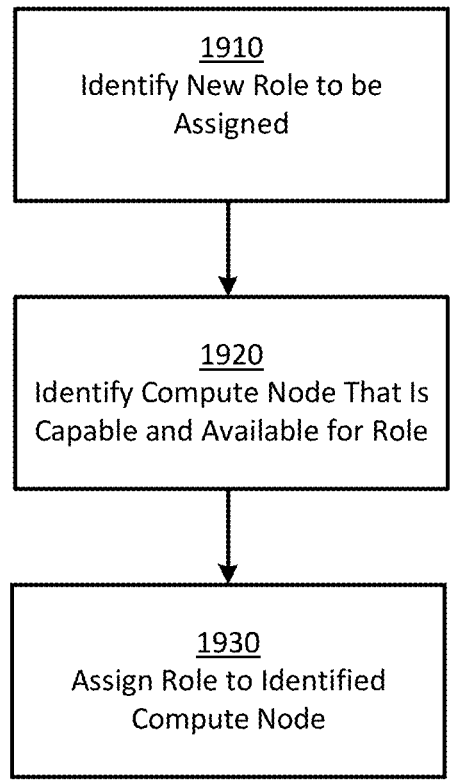
FIG. 19 is a flowchart of an exemplary method at a high level for automatic role assignment.

FIG. 19 is a flowchart of an exemplary method, at a high level, for automatic role assignment. In step 1910, a new compute role (or task) is identified as needing to be assigned to an existing compute node. Identification may be automated by discovery, for example, of an added system element or changed capability of an existing element, or may be identified by a user specifying a new role. In step 1920, an available compute node is identified for the new role. Determination of a selected compute node can be made based on any assumed or known configuration or capability of the various compute nodes, existing workload and excess capacity of the compute nodes, the licenses that the compute nodes have, and the requirements of the new role. Such identification of a selected compute node may be done using the scalar priority value list for that role. In step 1930, the new role is assigned to the identified compute node. For example, a new role may be identified by a user as a request for certain video analytics to be done on the output of a certain camera sensor. The system might first determine which compute nodes are capable of the video analytics requested, and then choose to assign the new role to the compute node of the capable compute nodes which may have the closest network proximity to the camera, or perhaps choose the compute node with the greatest unassigned video analytics capacity.

Figure 20:
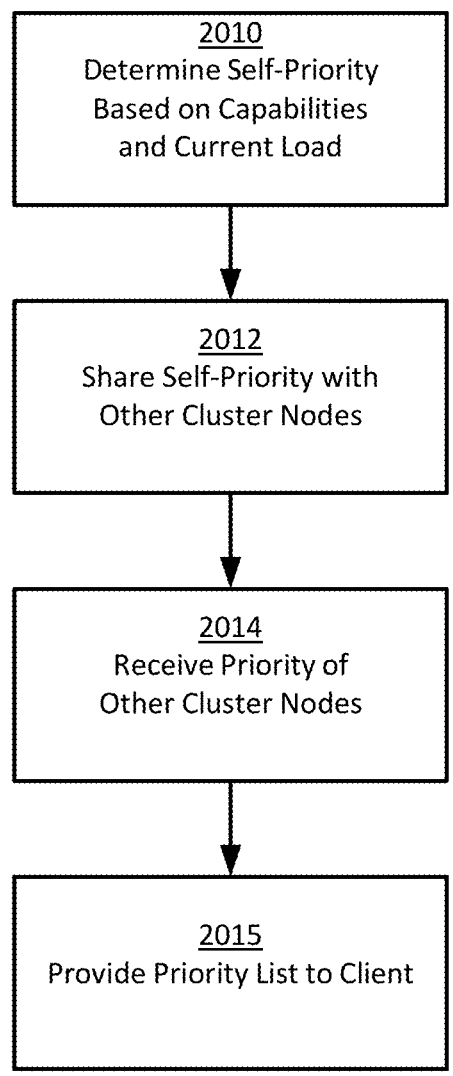
FIG. 20 is a flowchart of an exemplary method for creating a priority value list.

FIG. 20 is a flowchart of an exemplary method to create a priority value list for a particular service or role. A priority list here abstracts the hardware capabilities of the elements in a physical security system into a single scalar number that can be used to select an element such as a compute node from within a cluster of elements to be assigned a new role (or provide a service). In step 2010, a compute node determines a self-priority of the service, which is a single scalar priority value for providing the role from the compute node itself based on capabilities and current load. Then in step 2012, the self-priority is shared with other compute nodes in the cluster, and in step 2014, the priority of other compute nodes for that service/role is received from those other nodes. If every compute node follows this process, all compute nodes will have a copy of the complete priority list for that role for all compute nodes that are members of a cluster. In this way, a client that is not a compute node in the cluster need only know how to contact a single compute node in the cluster to be able to discover all nodes in a cluster and their corresponding priority values for any particular service. Similarly, priority value lists for other services or roles can also be shared among all nodes in a cluster. In step 2015, the aggregated priority list for the role is provided to a client. Sharing the roles and priorities among all nodes in a cluster also allows nodes within the cluster to efficiently delegate roles to optimize scalability, resiliency and improved performance of services.

The priority list aggregation can be done in several places. It can be done individually on every host node, as described above. I may also be done in a single centralized location within the cluster that queries every node for current priority values. Or a client may query every node directly for individual current priority values. As discussed above, changes in capabilities, such as changes in priority value due to changes in load, can be discovered and replicated using the protocols of FIG. 2, including the discovery protocol 206, gossip protocol 208, membership protocol 212, and status protocol 218.

Figure 21:
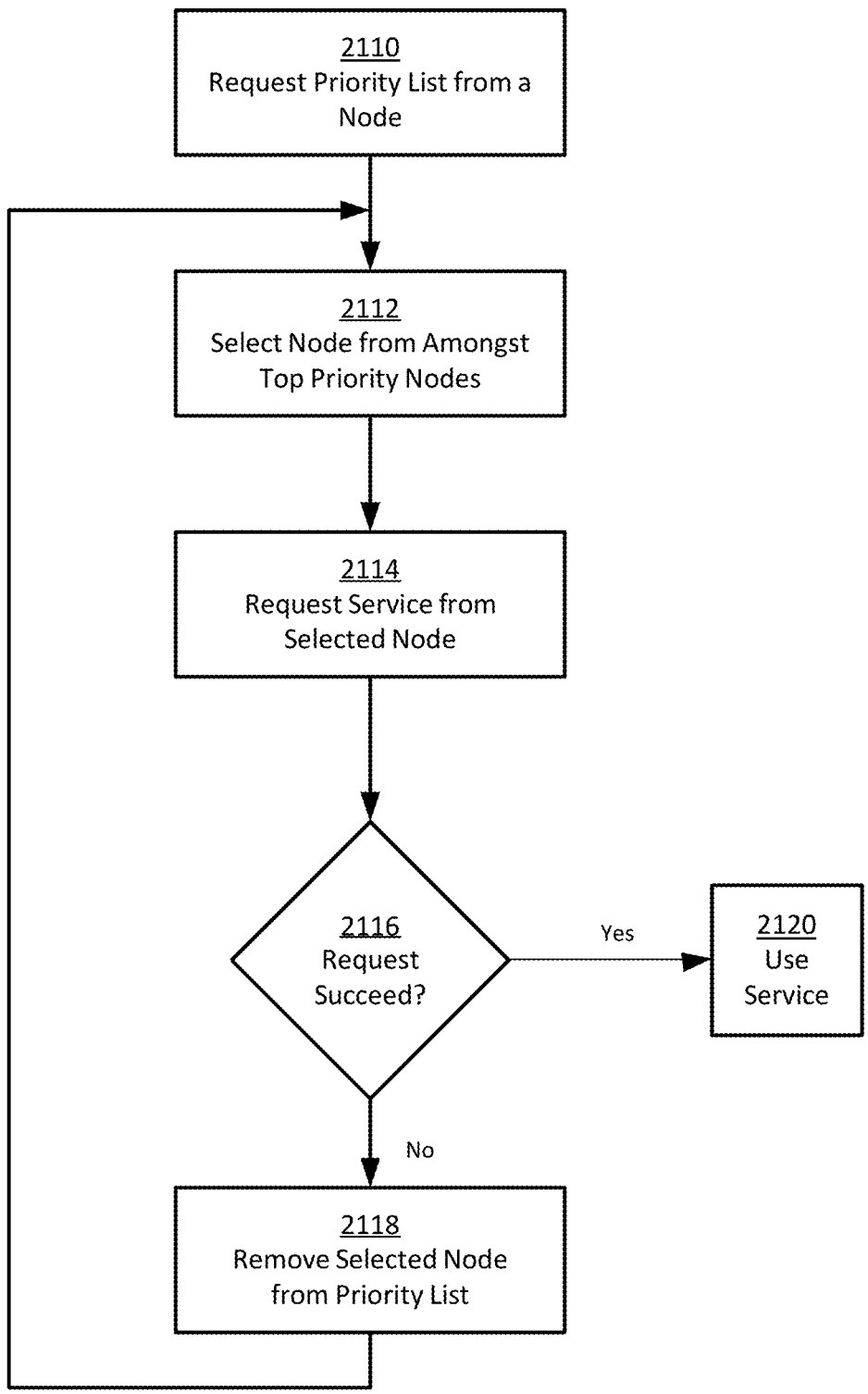
FIG. 21 is a flowchart of an exemplary method for using a service based on a priority value list.

FIG. 21 is a flowchart of an exemplary method for a client or compute node to use a service based on a priority value list so that a node is chosen that will provide the particular service. In step 2110, a client wishing to request or assign the service role can start by requesting the current priority list for that service role from any node in the cluster. A compute node can be selected in step 2112 from amongst the nodes in the priority list. Selection can be made, for example, by choosing the node with the highest priority, or from amongst the highest priority nodes with a tie-breaking mechanism. A node can also be selected based on the priority list along with other information such as other more specific capabilities or attributes of the possible nodes. In step 2114, the service is requested of the selected node (or a request is made to assign the desired role to the selected node). Step 2116 tests if the request succeeded, and if it did succeed, the service is used in step 2120. Alternately, if the request fails, the selected node can be removed from the client's copy of the priority list, and then loop back up to step 2112 to make a new node selection.

Figure 22:
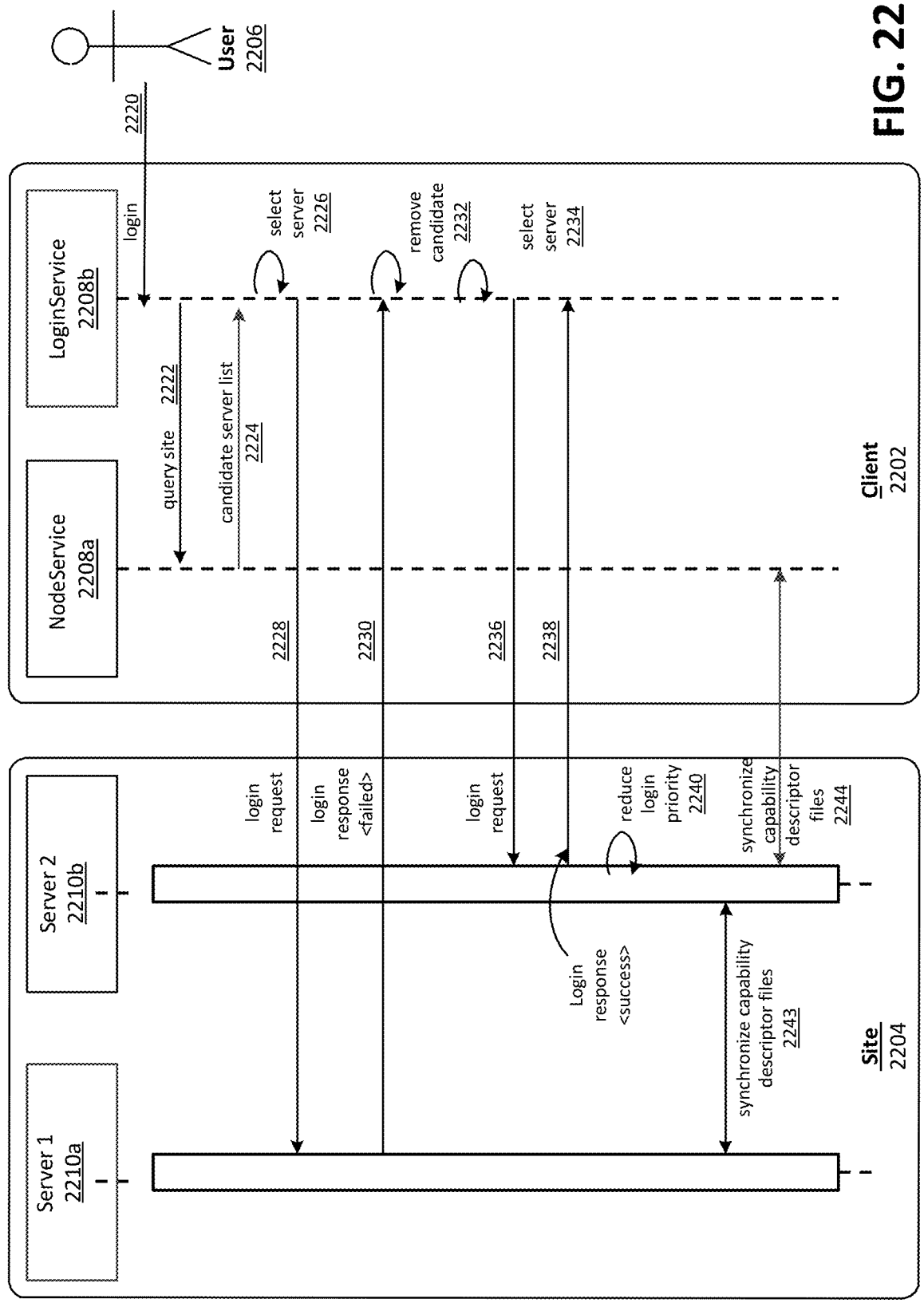
FIG. 22 illustrates an exemplary process for client selection of a node to provide a service based on priority list.

FIG. 22 illustrates an exemplary process for client selection of a node to provide a service based on a priority list. In this example, a user 2206 makes a request 2220 to use client 2202, a computer, to log onto the security system site 2204. To do so, the client computer 2202 must determine which compute node in site 2204 is best to provide the login and authentication service. Site 2204 consists of Server 1 2210*a* and a second node is Server 2 2210*b*, and client computer 2202 has a Node Service 2208*a* and Login Service 2208*b*. In this example, the client has already received a capabilities description file containing login service priority values via the node service 2208*a* for site 2204 containing servers 2210*a* and 2210*b*. In step 2222, the login service 2208*b* in the client requests the most recent copy of the priority list for the site 2204 from the node service 2208*a*. The local candidate server list is provided from the node service 2208*a* in step 2224, and contains unique identifiers of the servers, the network addresses of the servers and service ports, and the priority values for services such as the login service. In step 2226, the client selects a server by constructing a priority list for the login service using the priority values in the candidate server list and then selects the server 1 as it has the highest priority value. In step 222, the client performs a login requests to server 1 2210*a* and receives a failed response in step 2230. The client then removes server 1 in step 2232, and attempts another login to server 2 2210b in step 2236 as it is the next candidate in the priority list. Server 2 accepts the login request in step 2238, and the client completes the login process using Server 2 2210b as the login service provider. In step 2240, Server 2 2210b reduces its login priority value by subtracting a scalar constant. In step 2243, the reduced login priority value is then replicated to other nodes in the site via the node service, and also updated on the client 2202 in step 2224.

As described elsewhere herein and according to various example embodiments, compute nodes are logically partitioned into hierarchical sites. This hierarchical partitioning enables limiting the size of site and global directories, as well as facilitating self-configuration and assembly. According to such example embodiments, a first set or subset of compute nodes is logically partitioned into a site (hereinafter referred to as a "current site"). Each compute node performs a set of one or more services or roles assigned to it ("assigned services") within the current site. The set of assigned services may be defined by the types of services, the quantity (e.g., number of instances) and/or the frequency of the services.

As described elsewhere herein, the capabilities of a compute node may include one or more capacity limits. According to some example embodiments, the capabilities of a compute node includes a site capacity limit value that defines the capabilities of the compute node to maintain the performing of its one or more assigned services or roles within the current site to which the compute node belongs.

The computational load being handled by a compute node is dependent on the operating conditions within the current site. The operating conditions within the current site herein refer to the conditions that affect the set of services assigned to each of the compute nodes of the current site.

The operating conditions may include the types, quantity and/or frequency of client requests made to the current site. The client requests cause one or more services to be assigned and performed by one or more of the compute nodes. The client requests may also cause a change in the instances of one or more services already assigned to a compute node.

The operating conditions may include the types, quantity and/or frequency of instances of services being performed by the compute nodes. For a given compute node, the services being performed by other compute nodes may lead to a change in the services assigned to that given compute node.

The operating conditions may include the configuration of the current site. The set of services assigned to each compute node may depend on the configuration of the current site. For example, the set of assigned services for a given compute node may depend on the number of compute nodes within the current site (i.e., a higher number of compute nodes each performing its set of assigned services may cause more associated services to be assigned at other compute nodes).

For example, the set of assigned services may depend on the number of other types of nodes, such as sensor 1310, storage 1312, and special purpose processing units 1314. For example, a larger number of sensors 1310 may generate more data that needs to be processed, transferred or stored, which may lead to more services to be assigned to one or more compute nodes of the current site. For example, increased availability of storage being provided by the storage nodes of the current site may decrease the need to transfer data between compute nodes, which may decrease the computational load from services assigned to one or more compute nodes. Similarly, increased availability of special purpose processing units may also decrease the need for services optimized for such units to be performed by other compute nodes that may not be as well suited for performing such services. This may also decrease the computational load on those other compute nodes.

The configuration of the current site may also include the network interconnectivity of nodes of the current site. For example, a compute node that is connected to many other nodes may be assigned more services as compared to another compute node that is connected to fewer compute nodes.

In some example embodiments, the site capacity limit value of a compute node may define the types, quantity and/or frequency of instances of services that that compute node is capable of performing. For example, the site capacity limit value may define the maximum number of instances of a service of a particular type that the compute node is capable of performing within the current site. The site capacity limit value may be defined by the maximum number of instances of services of different types that the compute node is capable of performing. Additionally or alternatively, the site capacity limit value may define the maximum frequency of each of a plurality of different services that the compute node is capable of performing.

In some example embodiments, the site capacity limit value of a compute node may define a set of maximum operating conditions at which the node is capable of performing its assigned services. For example, the site capacity limit value of a compute node may define the limits of the configuration of a current site in which that compute node will continue to be capable of performing its assigned services. For example, the site capacity limit value may define the maximum number of compute nodes in a site at which the compute node will continue being capable of performing its assigned services. Additionally, or alternatively, the site capacity limit value may define the maximum number of one or more other types of nodes (e.g. sensor, storage, special purpose processing unit) in a site at which the compute node will continue being capable of performing its assigned services.

In a heterogeneous environment, the compute nodes of a current site have different site capacity limit values. A change in operating conditions within the current site may change the set of services or roles assigned to each of one or more compute nodes of the current site, which further changes the computational load to be handled by each of those compute node. The change in operating conditions may cause the site capacity limit values of one or more compute nodes to be exceeded. Accordingly, these compute nodes will no longer be capable of continuing to perform the services assigned to it.

According to various example embodiments, when a change in operating conditions within a current site occurs, a self-organization is carried out within the current site to ensure that each of compute nodes within the site is capable of continuing to perform the one or more services assigned to it within the current site.

According to one example embodiment, a self-organization may be carried out by identifying those compute nodes within the site whose site capacity limit values are exceeded as a result of the change in operating conditions within the current site. These compute nodes whose site capacity limit values are exceeded are then logically partitioned into one or more existing sites or new sites that are child sites to the current site.

As a result of the logical partitioning, the logically partitioned compute nodes no longer need to continue performing its assigned services within the current site. Instead, each of the partitioned nodes now perform those assigned services within the child site to which it belongs following the logically partitioning. The purpose of this logical partitioning is to have each of the partitioned compute nodes reside within a child site that has operating conditions that impose a lower computational load on the compute nodes so that the site capacity limit value of each compute node is not exceeded. The partitioned nodes may still be in communication with the current site through any network link that is connected to a node of the current site. It will be appreciated that the current site is now a parent site to the logically partitioned compute nodes.

Figure 23A:
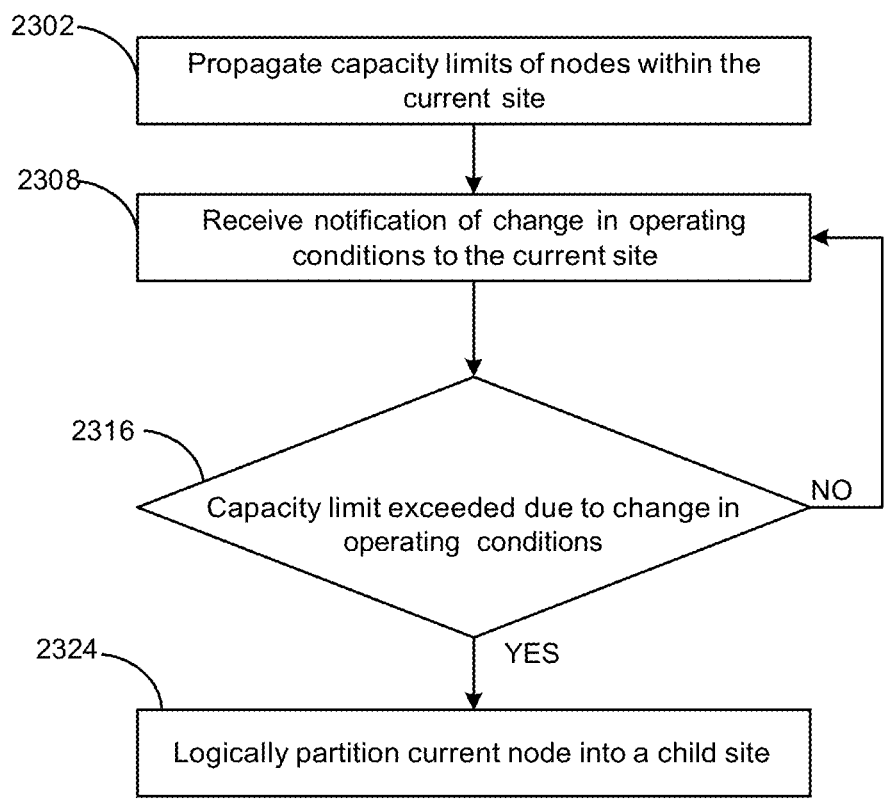
FIG. 23A illustrates an exemplary process for self-organizing at a given node of a current site having a plurality of nodes.

Referring now to FIG. 23A, therein illustrated is an exemplary process for self-organizing at a given node of a current site having a plurality of nodes.

At step 2302, the given node is performing it assigned services. One of its assigned services is to propagate the site capacity limit values of every compute node of the current site. The propagation is carried out so that each compute node within the current site knows the site capacity limit value of every other compute node within the current site. The propagating of site capacity limit values may be carried out according to the membership protocol 212 described elsewhere herein.

At 2308, the given node receives a notification of a change in operating conditions within the current site. This notification may be transmitted and received between two compute nodes according to the status protocol 218 described elsewhere herein. The notification may be propagated in a way so that each of the nodes receives the notification. For example, the propagation of the notifications throughout the nodes of the current site may also be carried out according to any method known in the art for broadcasting information across a network.

At 2316, it is determined whether the change in operation conditions notified at 2308 causes the site capacity limit value for the given node to be exceeded.

The site capacity limit value not being exceeded indicates that the given node will still be capable of performing its assigned services within the current site. Accordingly, the method returns to step 2308 to continue monitoring for notifications of further changes in the operating conditions.

The site capacity limit value being exceeded indicates that the operating conditions of the current site are such that the given node will no longer be capable of providing the service of maintaining site information across the site. Accordingly, the method proceeds to step 2324 to logically partition the given node into another site that is a child site of the current site. As a result, the given node is placed into a child site that has fewer member nodes. The given node can now perform its assigned services within the child site to which it has been partitioned.

It will be appreciated that if each node of the current site performs self-configuration according to the example method, each node whose site capacity limit value is exceeded will self-discover that it is incapable of supporting the increase in the number of compute nodes and will partition itself into a child site. As a result, only these nodes that have sufficient processing power or bandwidth to handle the change in operation conditions will remain within the current site. Accordingly, the nodes within the site self-configure in order to create logical partitions as child sites to ensure that all nodes in the system (both parent current site and one or more child sites) are capable of performing its respective assigned services.

According to one example embodiment, an assigned role/service to be performed by each of the compute nodes of the current site is maintaining site information across the current site. Providing the service, at each compute node, of maintaining site information refers to participating in the propagating of information and updates so that each compute node has stored therein a set of information about the current site and about the nodes of the current site. The maintaining of the site information is carried out to ensure that the set of site information stored at each node is the same as the set of site information stored at any other compute node of the current site. The maintaining of the site information further includes participating in the propagating of any updates to the set of site information so that any update is received and applied at each node of the site.

An update to the set of site information may originate at a single node within the site and the other nodes operate to ensure that the update is propagated to all other compute nodes within the current site. Accordingly, when performing the service of maintaining site information within the current site, an individual compute node of the current site may generate an update, receive an update from another compute node, and/or transmit an update to another compute node. Where the compute node generates an update or receives an update to site information, it further updates the set of site information stored at that compute node according to the update to site information that is received or generated.

A first type of update to the set of site information may be a user logging into the current site from a client device. The login request is received and processed at a single one of the compute nodes. However, once a given user is logged into that compute node, it may have access to information, roles and/or services available across the site. Accordingly, the logged in status associated to that user is propagated across the site so that the set of site information stored at each compute node of the site is updated to recognize the logged in status of that user.

A second type of update to the set of site information may be the occurrence of an event at one of the compute nodes. Information pertaining to the event is propagated across the current site so that the set of site information stored at each node of the site is updated to include the event. An event may be any operation at a given compute node that requires an operation to be performed by a compute node of the current site (that given node or another compute node). The event information is propagated across the current site so that an appropriate compute node may carry out the required operation and so that other nodes are aware that the operation has been carried out.

A first type of event may be a change in status of a sensor connected to one of the compute nodes (e.g., a sensor being connected to or disconnected from that compute node).

A second type of event may be an event detected by a sensor or a compute node. That type event may be propagated across the current site so that each compute node is aware of the event. Such events may include invalid login attempts at a client and a video analytics event, e.g., such as motion detection, trip wire detection, object recognition, etc., detected by a sensor node that is a camera.

A third type of event may be the triggering of a rule. A rule may be triggered in response to the occurrence of an event. For example, in response to a change in a status at a first sensor or a first compute node, a second compute node may begin performing a service in response. In one example, if a first compute node is disconnected from a first sensor, a second compute node may respond to connect to that sensor. In another example, if a first compute node receives a notification that a digital input on a first sensor has been activated, another compute node may cause another sensor to activate the digital output on another sensor.

An event may also be a user request for data stored at one of the compute nodes. Accordingly the request is propagated across the site so that the compute node that possesses the requested data can make available that data.

A third type of update to the set of site information may be an addition, removal or change to site configuration. The site configuration defines rules that apply across the entire current site. Configuration rules may include permitted users and applicable licenses. The configuration rules may also include rules that define actions to be performed in response to an event, as described elsewhere herein.

A fourth type of update to the set of site information may be addition, removal, or change of one or more individual nodes. For example, information pertaining to one or more compute nodes being removed from, added to or replaced from the site may be propagated so that the set of site information stored at each compute nodes indicates the total number of compute nodes currently within the site and the status of each compute node.

Each of the examples of updates to site information cause a change in operating conditions in that the instances of performing the service of maintaining site information by one or more nodes may increase or decrease accordingly.

According to various example embodiments, the site capacity limit value of each compute nodes defines the maximum number of nodes that may be found in the current site to which the compute node belongs. For example, the site capacity limit value may define the maximum number of compute nodes in the current site. Additionally, or alternatively, the site capacity limit value may define the maximum number of sensor nodes in the current site.

The site capacity limit value for a compute node may also define a first maximum number of compute nodes and a second maximum number of sensor nodes. Where either one of the first maximum number of compute nodes or the second maximum numbers of sensor nodes is exceeded, the site capacity limit value is considered as being exceeded.

It will be appreciated that as the number of compute and/or sensor nodes within the current site increases, the frequency of updates to the set of site information may also increase. For example, a larger number of compute and/or sensor nodes may be linked to an increase in users and/or user logins. A larger number of compute sensor nodes may also be linked to an increase in the frequency of occurrences of events. A larger number of compute nodes and/or may be further linked to an increase in the frequency of addition, removal, or change to individual nodes. Furthermore, a larger number of compute and/or nodes within the site will cause an increase in the number of transmitting and receiving of site information updates between compute nodes when propagating the updates across the site. It will be appreciated that each of these factors further increase the computational load imposed on the compute nodes of the current site.

According to such example embodiments, when an additional node is introduced to a current site, a self-organization is carried out within the current site to ensure that each of compute nodes within the site is capable of continuing to provide the service of maintaining site information within the site. A self-organization may be carried out by identifying those compute nodes within the site whose site capacity limit values are exceeded as a result of the addition of one or more new compute nodes and/or sensor nodes to the current site. Those compute nodes whose site capacity limit values are exceeded are then logically partitioned into one or more existing sites or new sites that become child sites to the current site.

Figure 23B:
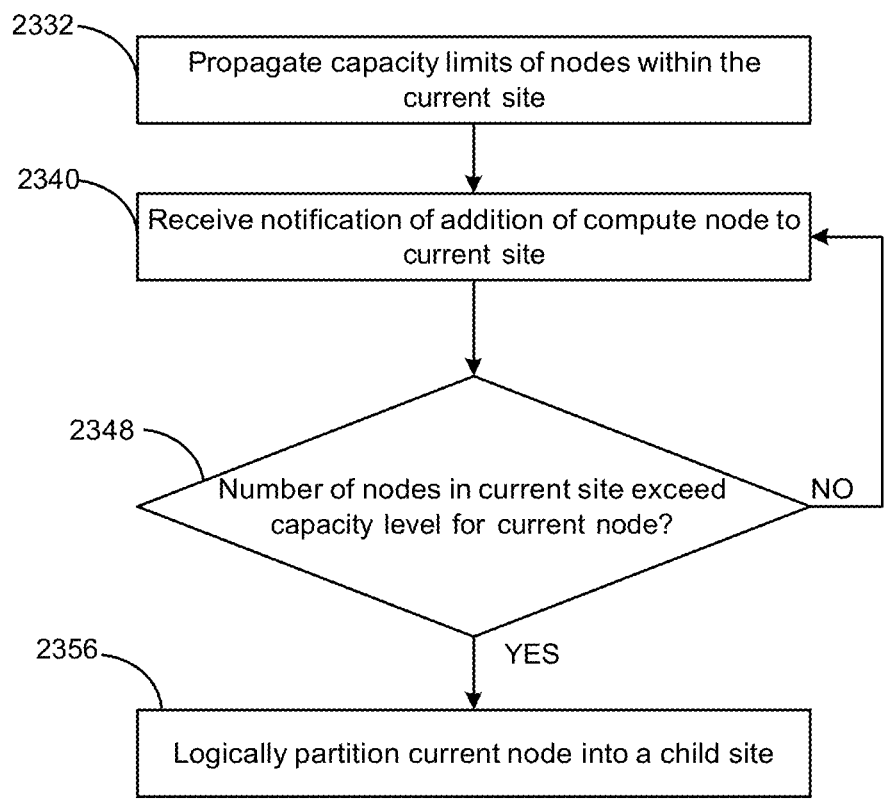
FIG. 23B illustrates an exemplary process for self-organizing at a given node of a current site having a plurality of nodes taking into account the addition of one or more new compute nodes and/or sensor nodes.

Referring now to FIG. 23B, therein illustrated is an exemplary process for self-organizing at a given node of a current site having a plurality of nodes.

At step 2332, the given node is participating in the maintaining of site information within the current site. More specifically, the given node is participating in the propagation of information pertaining to capacity limits or capacity limit values of the compute nodes of the current site.

At 2340, the given node receives a notification of addition of one or more new compute nodes and/or sensor nodes to the current site. While the addition of only one compute node is illustrated in FIG. 23B, the compute node could be a sensor node or some combination of computer nodes and sensors nodes. The notification may be received within updates of site information propagated across the current site.

At 2348, it is determined whether the number of compute nodes and/or sensor nodes in the current site following the addition of the one or more compute nodes at 2308 exceeds the site capacity limit value for the given node.

The site capacity limit value not being exceeded indicates that the given node will still be capable of providing the service of maintaining site information across the site. Accordingly, the method returns to step 2348 to continue monitoring for notifications of additions of new compute nodes to the current site.

The site capacity limit value being exceeded indicates that the current site has grown to such a size that the given node will no longer be capable of providing the service of maintaining site information across the site. Accordingly, the method proceeds to step 2356 to partition the given node into another site that is a child site of the current site. As a result, the given node is placed into a child site that has fewer member nodes. The given node can now provide the service of maintaining site information across the child site to which it has been partitioned. The given node no longer needs to be aware of the status of each and every other node in the current (parent) site, but can receive information about the status of these node through its connection with the current (parent) site.

Figure 24:
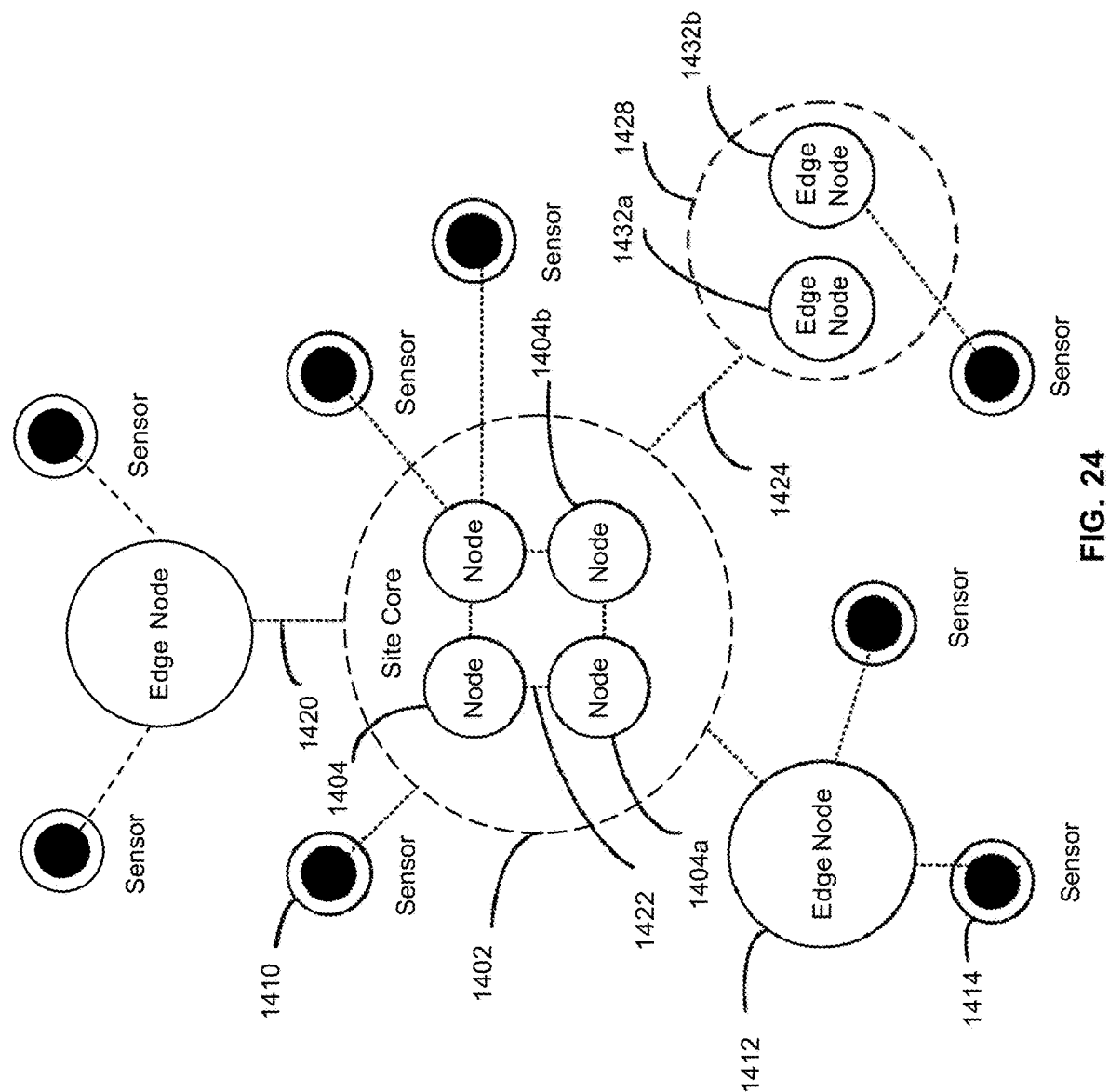
FIG. 24 illustrates a modified version of the two-tier model of compute nodes illustrated in FIG. 14 following self-organization due to the addition of new nodes.

Referring now to FIG. 24, therein illustrated is a schematic diagram of the physical security system illustrated in FIG. 14 following self-organization due to the addition of new nodes to the core site 1402. In the example configuration of FIG. 14, the core site 1402 is formed of three core nodes 1404. The physical security system is then changed by adding two new nodes 1404a and 1404b to the site core. As a result, the total number of core nodes 1404 increases to five, although only four core nodes 1404 are identified as such in FIG. 24, as further explained below. In the example, one of the three core nodes 1404 already existing in the site core now has a site capacity limit value of less than five (e.g., limit of 3 or limit of 4), which is exceeded due to the addition of the two new nodes 1404a and 1404b. As a result, as illustrated in FIG. 24, this core node self-configures to partition itself into another site 1428 that is a child to the core site 1402. In the illustrated example, the partitioned node is now identified as edge node 1432a and resides within the child site 1428 with edge node 1432b. That is, the edge node 1432a self-configured to leave the core site 1402 and to form the child site 1428 with the edge node 1432b that was already outside of the core site 1402. It will be appreciated that the edge node 1432a has self-configured to reside within a site that has less total nodes than the site capacity limit value of the edge node 1432*a*.

It will be understood that the edge node 1432*a* has been described to self-configure to form a child site with another edge node 1432*b* for example purposes only, and that in other examples, a node residing in a site whose site capacity limit value has been exceeded due to addition of one or more compute nodes may self-configure to partition itself into a site with a single node.

In some example embodiments, one or more additional factors may be taken into account when self-organizing the compute nodes. An example additional factor is the length of time that a compute node has been member of a current site.

In one example embodiment, a change in operation conditions may cause the site capacity limit value belonging to each of a given set of a plurality of compute nodes of the current site to be exceeded. However, the site capacity limit values may be such that if a subset of the set of plurality of compute nodes is logically partitioned from the current site, the site capacity limit values of the remaining compute nodes of the subset will no longer be exceeded. Accordingly, these remaining compute nodes can continue to support the service of maintaining site information within the current site. For example, the choice of which compute nodes of the subset is logically partitioned to a child site and which other compute nodes of the subset are kept within the current site may be made based on the length of time each compute node of the subset has been in the current site. For example, the compute nodes of the subset that have been in the current site for longer lengths of time are kept within the current site while compute nodes of the subset that have been in the current site for shorter lengths of time are logically partitioned from the current site.

In some example embodiments, a compute node that has been logically partitioned from the current site may be added to an existing child site. Similarly, where two or more compute nodes are logically partitioned at the same time from the current site, the two or more compute nodes may be logically partitioned into the same child site (an existing child site or a new child site). For example, whether two or more compute nodes may be allowed to reside into the same child site if the two or more compute nodes are children nodes to the same parent site, the two or more compute nodes have network connectivity with one another, and none of the site capacity limit values of the two or more compute nodes are exceeded when residing within the same child site.

While numerous particular embodiments have been described in the foregoing, it is to be understood that still other embodiments are possible and are intended to be included herein. It will be clear to any person skilled in the art that modification of and adjustments to the foregoing embodiments, not shown, are possible, including any logical combination of one or more elements illustrated and described herein with one or more other elements illustrated and described herein.

What is claimed:

1. A system for discovering capabilities of a heterogeneous physical security system, comprising:
a compute node that is a member of the system, configured to:
determine a self-priority value for the compute node, wherein the self-priority value is a single scalar value that indicates a priority for providing a service by the compute node, wherein the self-priority value is based at least in part on a license type of the compute node that at least in part defines capabilities of the compute node; and
provide the self-priority value to a service requestor.

2. The system of claim 1, wherein the compute node is further configured to:
provide the self-priority value and an identifier for the compute node to one or more other compute nodes, wherein the other compute nodes are also members of the system;
receive additional priority values for providing the service and associated compute node identifiers for the one or more other compute nodes;
create a service priority list comprising the self-priority value and additional priority values with associated compute node identifiers; and
provide the service priority list to the service requestor;
wherein the compute node members of the system have heterogeneous capabilities, and the additional priority values are based at least in part on the capabilities of the associated compute node.

3. The system of claim 1, wherein the capabilities of the compute node include one or more of capacity limits, a hardware capability, a software capability, and a current node load.

4. The system of claim 1, wherein the license type includes one or more of enterprise, standard, core, and embedded.

5. The system of claim 3, wherein the capabilities of the compute node includes a hardware capability, where the hardware capability includes one or more of storage capacity, network connection type or bandwidth, processor type, memory capacity, and video analytics.

6. The system of claim 3, wherein the capabilities of the compute node includes a current node load, and where the current node load is based on a count of instances of the service concurrently being provided by the compute node to any service requestor.

7. The system of claim 6, wherein the self-priority value is determined at least in part by starting with a first scalar constant, and then subtracting a second scalar constant for each of the count of instances being provided.

8. The system of claim 7, wherein the first scalar constant is determined by at least one of: the license type, capacity limits, and a hardware capability.

9. The system of claim 2, additionally comprising a physical security system client computer configured to:
receive the service priority list; and
select a compute node member of the system to provide the service based at least in part on the self-priority value and the additional priority values in the service priority list.

10. The system of claim 1, wherein the service comprises at least one of: a host for a physical security system client, a storage node for recording a video stream, transcoding of a video stream, and performing analytics on a video stream.

11. The system of claim 1, wherein the compute node is further configured to create a plurality of priority lists for a plurality of services, each priority list corresponding to one service.

12. A non-transitory computer readable medium comprising:
instructions for discovering capabilities in a heterogeneous physical security system, the medium comprising instructions that, when executed on a compute node, cause the compute node to at least:
determine a self-priority value for the compute node, wherein the self-priority value is a single scalar value that indicates a priority for providing a service by the compute node, wherein the self-priority value is based at least in part on a license type of the compute node that at least in part defines capabilities of the compute node; and provide the self-priority value to a service requestor.

13. The non-transitory computer readable medium of claim 12, wherein the instructions further cause the compute node to at least:

provide the self-priority value and an identifier for the compute node to one or more other compute nodes, wherein the other compute nodes are also members of the system;

receive additional priority values for providing the service and associated compute node identifiers for the one or more other compute nodes;

create a service priority list comprising the self-priority value and the additional priority values with associated compute node identifiers; and provide the service priority list to a service requestor;

wherein the compute node members of the system have heterogeneous capabilities, and the additional priority values are based at least in part on the capabilities of the associated compute node.

14. The non-transitory computer readable medium of claim 12, wherein the capabilities of the associated compute node include one or more of a hardware capability and a current node load.

15. The capability discovery system of claim 12, wherein the license type includes one or more of enterprise, standard, core, and embedded.

16. The non-transitory computer readable medium of claim 14, wherein, wherein the capabilities of the associated compute node includes a hardware capability, where the hardware capability includes one or more of storage capacity, network connection type or bandwidth, and video analytics.

17. The non-transitory computer readable medium of claim 14, wherein the capabilities of the associated compute node includes a current node load, where the current node load is based on a count of instances of the service concurrently being provided by the associated compute node to any service requestor.

18. The non-transitory computer readable medium of claim 17, wherein the self-priority value is determined at least in part by starting with a first scalar constant, and then subtracting a second scalar constant for each of the count of instances being provided.

19. The non-transitory computer readable medium of claim 18, wherein the first scalar constant is determined by at least one of: the license type, capacity limits, and a hardware capability.

20. The non-transitory computer readable medium of claim 12, wherein the service comprises at least one of: a host for a physical security system client, a storage node for recording a video stream, transcoding of a video stream, and performing analytics on a video stream.

21. The non-transitory computer readable medium of claim 12, wherein the instructions further cause the compute node to at least:

create a plurality of priority lists for a plurality of services, each priority list corresponding to one service.

* * * * *